(12) United States Patent
Zhang et al.

(10) Patent No.: US 12,160,393 B2
(45) Date of Patent: Dec. 3, 2024

(54) SUB-BAND BASED CROSS-LINK INTERFERENCE REPORT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/647,080

(22) Filed: Jan. 5, 2022

(65) Prior Publication Data
US 2023/0216648 A1 Jul. 6, 2023

(51) Int. Cl.
*H04L 5/00* (2006.01)
*H04B 17/345* (2015.01)

(52) U.S. Cl.
CPC ......... *H04L 5/0085* (2013.01); *H04B 17/345* (2015.01); *H04L 5/0048* (2013.01)

(58) Field of Classification Search
CPC ... H04L 5/0085; H04L 1/0028; H04L 5/0051; H04L 5/0048; H04L 5/0091; H04L 5/0073; H04L 1/0026; H04B 17/345
See application file for complete search history.

(56) References Cited

U.S. PATENT DOCUMENTS

| | | | | |
|---|---|---|---|---|
| 2009/0245221 A1* | 10/2009 | Piipponen | ............. | H04W 88/06 370/343 |
| 2021/0219155 A1* | 7/2021 | Ye | ......................... | H04L 5/0048 |
| 2021/0289374 A1 | 9/2021 | Zhang et al. | | |
| 2022/0386156 A1* | 12/2022 | Park | ...................... | H04W 24/10 |
| 2023/0055304 A1* | 2/2023 | Shim | .................... | H04B 17/345 |
| 2023/0090986 A1* | 3/2023 | Jang | ....................... | H04W 24/00 370/329 |
| 2023/0179380 A1* | 6/2023 | Huang | .................. | H04L 5/0057 370/252 |
| 2023/0189382 A1* | 6/2023 | Haustein | ............... | H04W 76/20 370/329 |

FOREIGN PATENT DOCUMENTS

| | | | |
|---|---|---|---|
| WO | 2020166818 A1 | 8/2020 | |
| WO | 2021226620 A1 | 11/2021 | |

OTHER PUBLICATIONS

Huawei et al., "Discussion on Handling of Exceptional Configuration for CLI Measurement", 3GPP TSG-RAN2 Meeting #107, R2-1911013, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019 Aug. 16, 2019, XP051768775, pp. 1-3, p. 1, paragraph 1, p. 2, paragraph 2.1.
International Search Report and Written Opinion—PCT/US2022/082533—ISA/EPO—May 8, 2023.

* cited by examiner

*Primary Examiner* — Brian D Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive cross-link interference (CLI) configuration information that indicates a plurality of sub-bands for a CLI measurement resource. The UE may transmit a CLI report indicating at least one CLI metric associated with at least one sub-band of the plurality of sub-bands. Numerous other aspects are described.

30 Claims, 12 Drawing Sheets

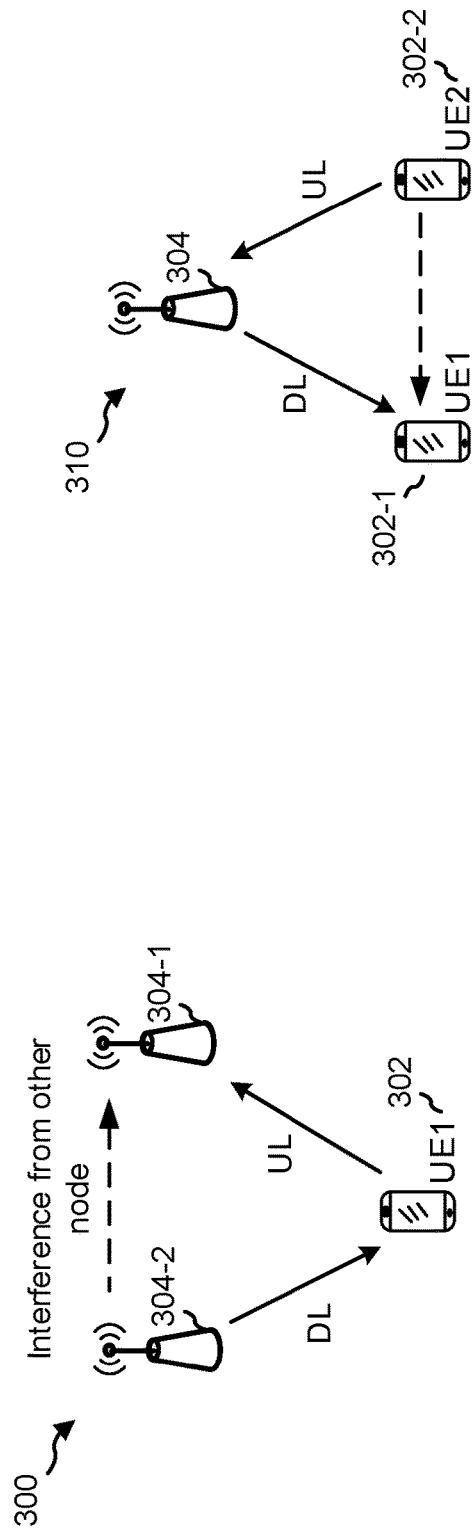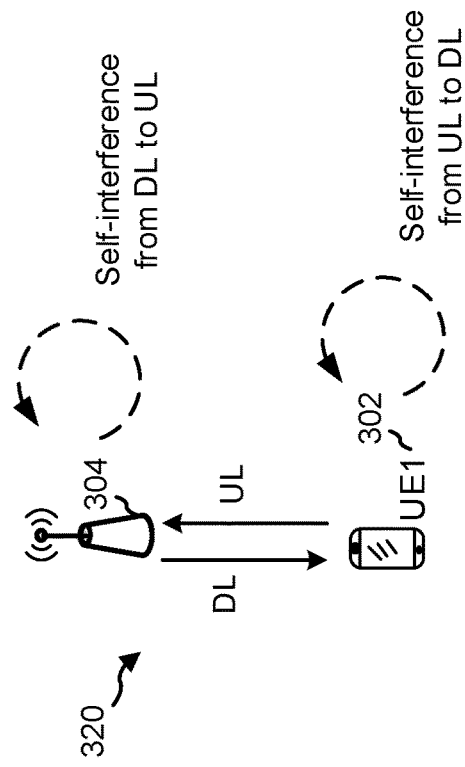
FIG. 3B
FIG. 3C
FIG. 3A

704

CLI-ReportConfig information element

```
CLI – ReportConfig ::= SEQUENCE {
    reportConfigId              CLI-ReportConfigId,
    carrier                     ServCellIndex            OPTIONAL, -- Need S
    resourceForCLIMeasurement   SRS-ResourceConfigId,    OPTIONAL, -- Need R
    ...
    ...
    reportQuantity              CHOICE {
        none                    NULL,
        CLI-SRS-RSRP,           NULL,
        CLI-RSSI,               NULL
    },
706-3     startPRB (for SBi),   INTEGER (0...2169),
708-3     nrofPRB (for SBi),    INTEGER (0...2169),
706-6     startPRB (for SBj),   INTEGER (0...2169),
708-6     nrofPRB (for SBj),    INTEGER (0...2169),
    ...
}
```

FIG. 7B

SUB-BAND BASED CROSS-LINK INTERFERENCE REPORT

FIELD OF THE DISCLOSURE

Aspects of the present disclosure generally relate to wireless communication and to techniques and apparatuses for sub-band based cross-link interference report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving cross-link interference (CLI) configuration information that indicates a plurality of sub-bands for a CLI measurement resource. The method may include transmitting a CLI report indicating at least one CLI metric associated with at least one sub-band of the plurality of sub-bands.

Some aspects described herein relate to a method of wireless communication performed by a base station. The method may include transmitting, to a UE, CLI configuration information that indicates a plurality of sub-bands for a CLI measurement resource. The method may include receiving, from the UE, a CLI report indicating at least one CLI metric associated with at least one sub-band of the plurality of sub-bands.

Some aspects described herein relate to a non-transitory computer-readable medium that stores a set of instructions for wireless communication by a user equipment (UE). The set of instructions, when executed by one or more processors of the UE, may cause the UE to receive CLI configuration information that indicates a plurality of sub-bands for a CLI measurement resource. The set of instructions, when executed by one or more processors of the UE, may cause the UE to transmit a CLI report indicating at least one CLI metric associated with at least one sub-band of the plurality of sub-bands.

Some aspects described herein relate to a non-transitory computer-readable medium that stores a set of instructions for wireless communication by a base station. The set of instructions, when executed by one or more processors of the base station, may cause the base station to transmit, to a UE, CLI configuration information that indicates a plurality of sub-bands for a CLI measurement resource. The set of instructions, when executed by one or more processors of the base station, may cause the base station to receive, from the UE, a CLI report indicating at least one CLI metric associated with at least one sub-band of the plurality of sub-bands.

Some aspects described herein relate to an apparatus for wireless communication. The apparatus may include means for receiving CLI configuration information that indicates a plurality of sub-bands for a CLI measurement resource. The apparatus may include means for transmitting a CLI report indicating at least one CLI metric associated with at least one sub-band of the plurality of sub-bands.

Some aspects described herein relate to an apparatus for wireless communication. The apparatus may include means for transmitting, to a UE, CLI configuration information that indicates a plurality of sub-bands for a CLI measurement resource. The apparatus may include means for receiving, from the UE, a CLI report indicating at least one CLI metric associated with at least one sub-band of the plurality of sub-bands.

Some aspects described herein relate to a UE for wireless communication. The user equipment may include a memory and one or more processors coupled to the memory. The one or more processors may be configured to receive CLI configuration information that indicates a plurality of sub-bands for a CLI measurement resource. The one or more processors may be configured to transmit a CLI report indicating at least one CLI metric associated with at least one sub-band of the plurality of sub-bands.

Some aspects described herein relate to a base station for wireless communication. The base station may include a memory and one or more processors coupled to the memory. The one or more processors may be configured to transmit, to a UE, CLI configuration information that indicates a plurality of sub-bands for a CLI measurement resource. The one or more processors may be configured to receive, from the UE, a CLI report indicating at least one CLI metric associated with at least one sub-band of the plurality of sub-bands.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

FIGS. 7A and 7B are diagrams illustrating example information elements (IEs) that may be used to indicate CLI configuration information and/or sub-band CLI measurement resource configurations in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
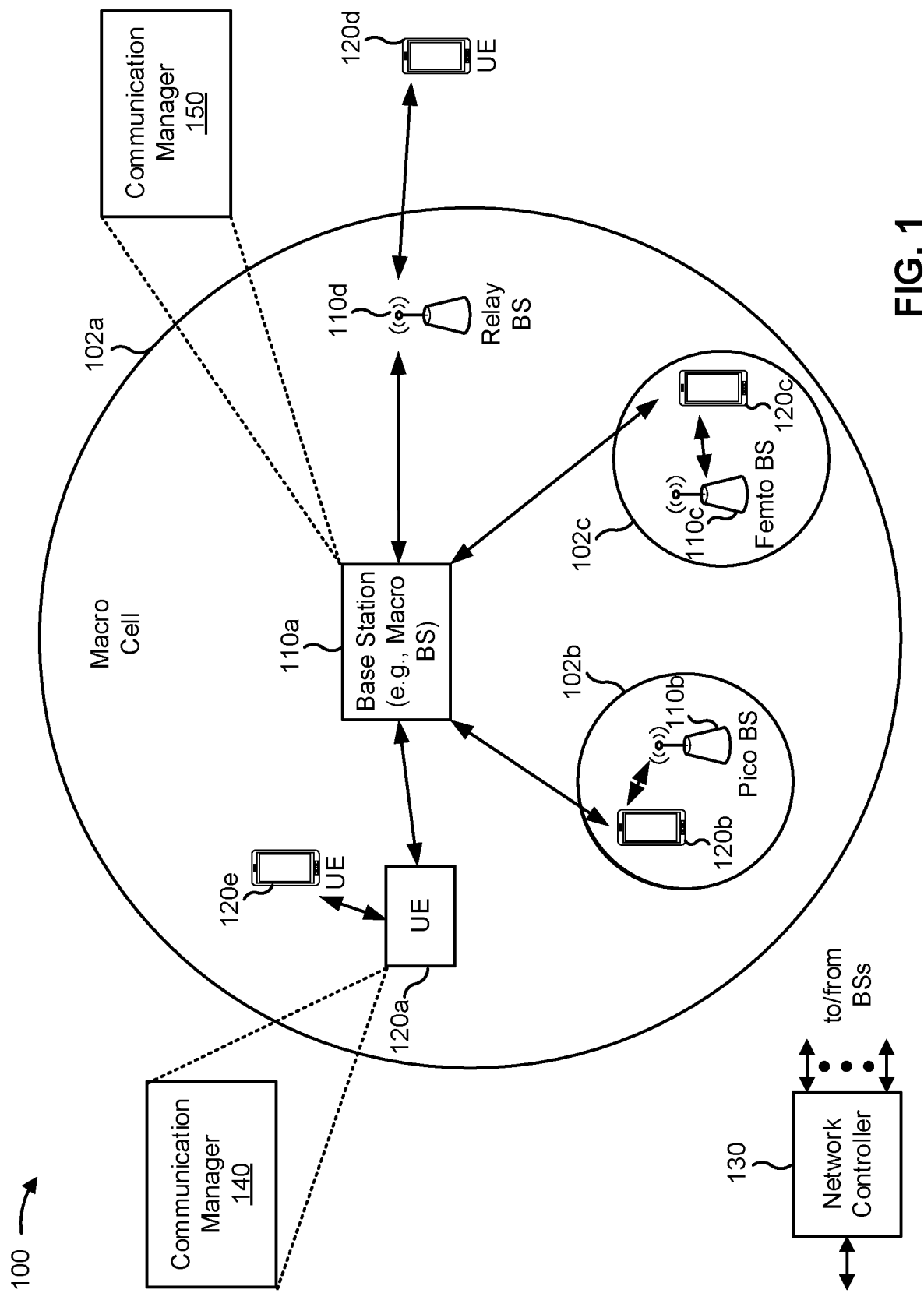
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive CLI configuration information that indicates a plurality of sub-bands for a CLI measurement resource; and transmit a CLI report indicating at least one CLI metric associated with at least one sub-band of the plurality of sub-bands. Additionally, or alternatively, the communication manager 140 may perform one or more other operations described herein.

In some aspects, the base station 110 may include a communication manager 150. As described in more detail elsewhere herein, the communication manager 150 may transmit, to a UE, CLI configuration information that indicates a plurality of sub-bands for a CLI measurement resource; and receive, from the UE, a CLI report indicating at least one CLI metric associated with at least one sub-band of the plurality of sub-bands. Additionally, or alternatively, the communication manager 150 may perform one or more other operations described herein.

As indicated above, FIG. 1 is provided as an example. Other examples may differ from what is described with regard to FIG. 1.

Figure 2:
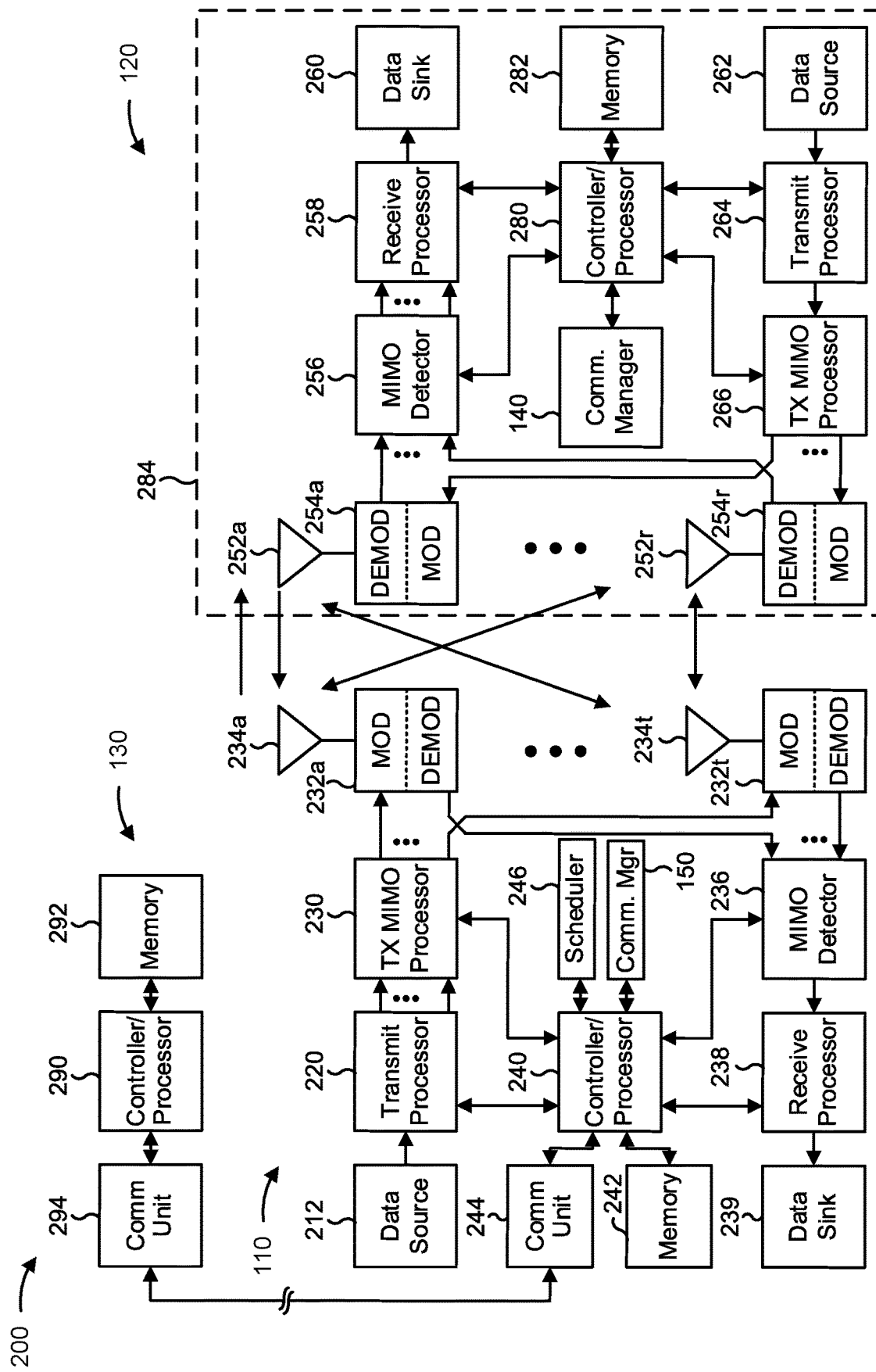
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with sub-band CLI reporting, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving CLI configuration information that indicates a plurality of sub-bands for a CLI measurement resource; and/or means for transmitting a CLI report indicating at least one CLI metric associated with at least one sub-band of the plurality of sub-bands. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., BS 110) includes means for transmitting, to a UE, CLI configuration information that indicates a plurality of sub-bands for a CLI measurement resource; and/or means for receiving, from the UE, a CLI report indicating at least one CLI metric associated with at least one sub-band of the plurality of sub-bands. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG), as described in more detail in connection with FIG. 4.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UE1 302-1 and UE2 302-2. Thus, the UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304. In the example 320 of FIG. 3C, the UE1 302 and the base station 304 communicate using a beam pair. A beam pair may include a downlink beam and an uplink beam. For example, a UE1 302 may use a beam pair that includes a downlink beam (that is, a receive beam) at the UE1 302 and an uplink beam (that is, a transmit beam) at the UE1 302 to communicate with the base station 304. The base station 304 may use a downlink beam (that is, a transmit beam) at the base station 304 to transmit communications received via the UE1 302's downlink beam, and may use an uplink beam (that is, a receive beam) at the base station 304 to receive communications transmitted via the UE1 302's uplink beam. In some aspects, and with regard to any of FIGS. 3A-3C, the UE 302 may be considered the UE 120 of FIG. 1, and the BS 304 may be considered the BS 110 of FIG. 1.

In FIGS. 3A-3C, interference is indicated by dashed lines. Interference can occur between nodes of examples 300, 310, 320 (referred to as "cross-link interference" (CLI)). Examples of CLI are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a BS 304 (from a downlink transmission to an uplink reception) are shown in FIG. 3C. It should be noted that the above-described CLI and self-interference conditions can occur in HD deployments and in FD deployments.

UEs communicating with an FD base station (as in example 310 of FIG. 3B) may experience CLI. For example, a base station capable of FD FDM communications may transmit a downlink (DL) transmission to a first UE and receive an uplink (UL) transmission from a second UE using overlapped time resources and different frequencies for the transmissions. The DL transmission to the first UE may be subject to CLI related to the UL transmission by the second UE, which may cause increased recovery errors and reduced data throughput at the first UE.

In some cases, the first UE (referred to as a receive (Rx) UE) may provide a CLI measurement report to the base station that indicates CLI caused by the second UE's (referred to as a transmit (Tx) UE) UL transmission. The base station may use the CLI measurement report to determine modified air interface resource assignments (e.g., modified gap frequency band sizes, modified frequency assignments, modified time assignments, and/or modified modulation and coding scheme (MCS) assignments) for the DL transmissions and/or the UL transmissions to mitigate the CLI observed at the first UE. In other words, based at least in part on the CLI measurement report, the base station may select modified air interface resources to reduce CLI observed by the first UE, reduce recovery errors at the first UE, and/or increase data throughput at the first UE. However, CLI measurement reporting in some deployments may occur at a granularity that can reduce the effectiveness of how the base station determines the modified air interface resources, and, subsequently, cause the base station to select modified air interface resources that fail to mitigate the CLI, as described below.

Some communication systems, such as 5G NR, provide the base station with an ability to assign air interface resources with more granularity relative to prior communication systems. For example, a wideband may include an operating bandwidth or frequency of a UE and may be subdivided into two or more sub-bands. In one example, an 80 MHz wideband may be divided into four 20 MHz sub-bands, though any subdivision of sub-bands can be used. 5G NR provides the base station with an ability to assign sub-bands of the wideband and/or portions of the sub-bands to different purposes, such as any combination of DL communications, UL communications, and/or frequency guard bands between the DL and UL communications. This allows the base station to efficiently assign the air interface resources at a finer granularity, avoid wasting frequency resources, and improve a capacity of UEs supported in a wireless network. As used herein, "assigning a sub-band" for a purpose can refer to configuring the sub-band for the purpose (e.g., using semi-static or static signaling) or dynamically assigning the sub-band for the purpose (e.g., using dynamic signaling).

Many measurements, however, are configured and performed at the wideband granularity, meaning that a measurement may be determined with reference to an entire wideband. For example, Layer 3 (L3) CLI measurements are filtered (e.g., using thresholds, event triggers, measurement averages, etc.) over time and may provide one CLI measurement for a CLI measurement resource (e.g., at a wideband granularity), which may result in imprecise information regarding CLI on the sub-bands of the wideband. To illustrate, the UL transmission may cause varying CLI in each sub-band such that the L3 CLI measurement reports at a wideband granularity may result in imprecise CLI information for making assignments at a sub-band granularity. The imprecise CLI information may cause a base station to select modifications to sub-band assignments that result in more CLI at the first UE and/or that fail to mitigate the CLI at the first UE. In some cases, the imprecise CLI information may cause the base station to make modifications to the sub-band assignments that consume additional air interface resources (e.g., by needlessly increasing a size of a frequency guard band and/or increasing a sub-band separation between DL and UL transmissions) and decrease the quantity of UEs supportable by the base station.

Some techniques and apparatuses described herein provide sub-band based CLI measurement reporting. Sub-band based CLI measurement reporting enables a base station to configure an Rx UE to report CLI measurements based at least in part on a sub-band granularity, such as by configuring the Rx UE to report CLI measurements for each sub-band or to omit irrelevant sub-bands in the CLI measurements. Sub-band based CLI measurement reporting provides the base station with information about how CLI affects each particular sub-band and, subsequently, enables the base station to determine modifications to air interface resource assignments at a sub-band granularity. Modifications at a sub-band granularity help mitigate CLI at the Rx UE and, in turn, reduce recovery errors and improves data throughput at the Rx UE. Sub-band based CLI measurement reporting also allows the base station to optimize air interface resource assignments, which reduces waste and increases a quantity of UEs that the base station can support.

In some aspects, a base station transmits CLI configuration information to a UE, where the CLI configuration information indicates a plurality of sub-bands for a CLI measurement resource. In one example, the CLI configuration information indicates multiple CLI measurement report configurations, where each CLI measurement report configuration indicates information for the CLI measurement resource in a respective sub-band of the plurality of sub-bands. Based at least in part on transmitting the CLI configuration information to the UE, the base station receives, from the UE, a CLI report indicating at least one CLI metric associated with at least one sub-band of the plurality of sub-bands.

In some aspects, a UE receives, from a base station, CLI configuration information that indicates a plurality of sub-bands for a CLI measurement resource. For example, the CLI configuration information indicates CLI measurement report configurations for the CLI measurement resource, where each CLI measurement report corresponds to a respective sub-band of the plurality of sub-bands. Based at least in part on the CLI configuration information, the UE generates one or more CLI metrics associated with at least one sub-band of the plurality of sub-bands and transmits, to the base station, a CLI report that indicates the one or more CLI metric.

As indicated above, FIGS. 3A-3C are provided as one or more examples. Other examples may differ from what is described with regard to FIGS. 3A-3C.

Figure 4:
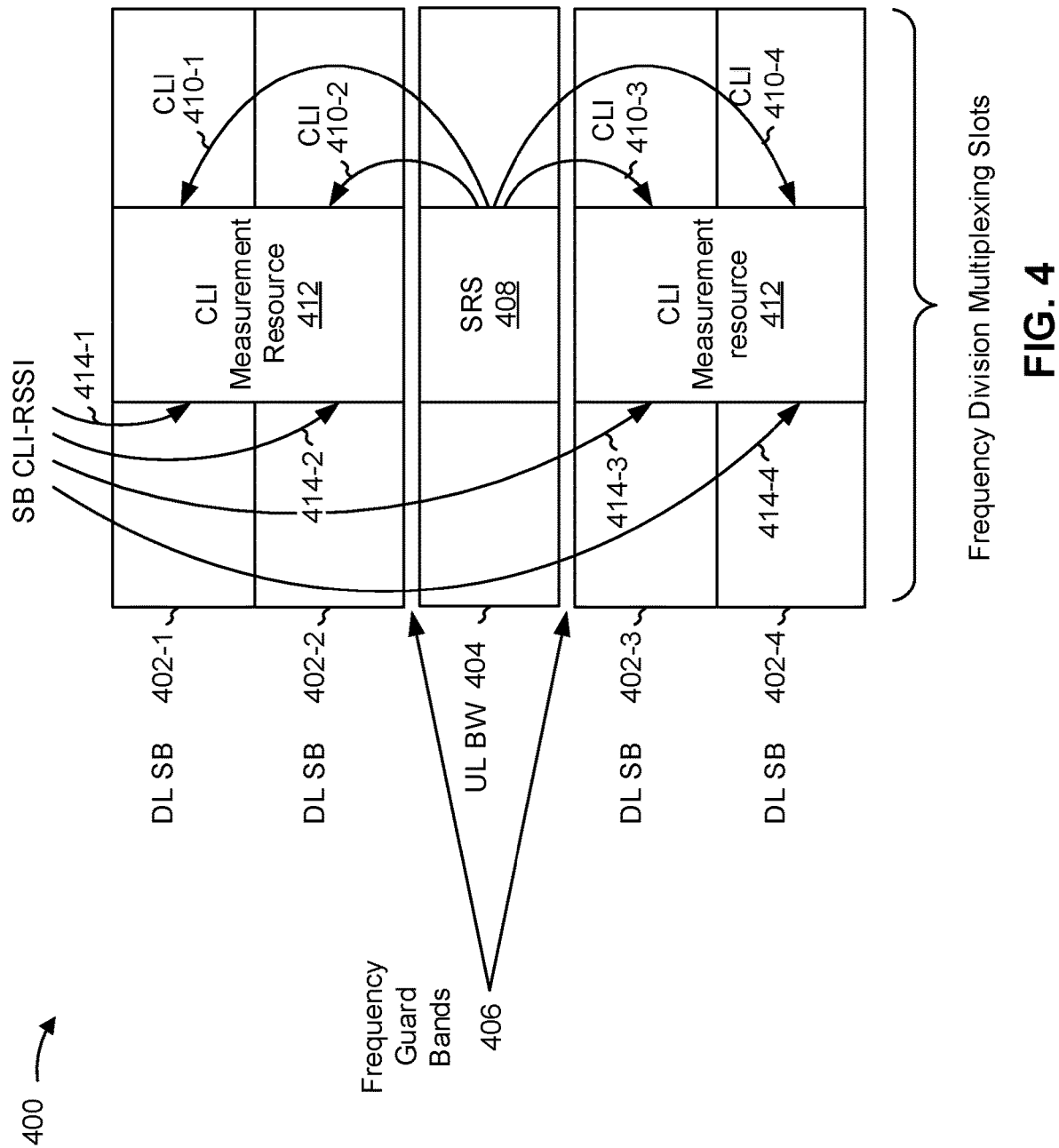
FIG. 4 is a diagram illustrating an example of frequency division multiplexed (FDMed) slots that are partitioned into sub-bands, in accordance with the present disclosure.

FIG. 4 is a diagram illustrating an example 400 of frequency division multiplexed (FDMed) slots that are partitioned into sub-bands, in accordance with the present disclosure. The example 400 also shows usage assignments (e.g., DL communications, UL communications, and frequency guard bands) for each sub-band, which can include multiple usage assignments to a single sub-band. As mentioned above, a usage assignment may indicate whether a sub-band is to be used for DL communication, UL communication, or as a frequency guard band, and can be static, semi-static, dynamic, or a combination thereof.

In some cases, a base station (not shown in FIG. 4), such as the base station 304 described above in connection with FIG. 3B, determines the usage assignments for each sub-band and/or configures an Rx UE (e.g., UE 120, not shown in FIG. 4) to generate one or more CLI metrics for one or more sub-bands of a CLI measurement resource. A CLI metric may include a measurement value, and may be determined based at least in part on measuring CLI, such as from a Tx UE (not shown), on a CLI measurement resource. For example, the base station may direct the Rx UE to generate a sounding reference signal (SRS) reference signal received power (SRS-RSRP) metric and/or a CLI received signal strength indicator (CLI-RSSI) metric for one or more of the sub-bands, where the SRS-RSRP metric and the CLI-RSSI metric are examples of CLI metrics.

The usage assignments shown by the example 400 include four assignments to DL communications: downlink sub-band 402-1 (DL SB 402-1), downlink sub-band 402-2 (DL SB 402-2), downlink sub-band 402-3 (DL SB 402-3), and downlink sub-band 402-4 (DL SB 402-4). The DL SB 402-1 and the DL SB 402-2 may be considered continuous sub-bands, which may also be referred to as contiguous sub-bands or adjacent sub-bands. Similarly, the DL SB 402-3 and the DL SB 402-4 may be considered continuous, contiguous and/or adjacent sub-bands. However, the CLI measurement resource may span discontinuous, dis-contiguous, and/or non-adjacent sub-bands, and/or may span frequency spectrum that has not been partitioned into sub-bands. The usage assignments also include an UL communication assignment for a Tx UE and a frequency guard band assignment that provides frequency separation between the UL and DL sub-bands (e.g., between UL and DL communications). Uplink bandwidth 404 (UL BW 404), for example, corresponds to a first bandwidth portion of a sub-band that has an UL communication usage assignment. Frequency guard bands 406 correspond to additional bandwidth portions of the sub-band that have frequency guard band usage assignments. While the example 400 shows the UL BW 404 and the frequency guard bands 406 as occupying a same sub-band and being continuous and/or contiguous with one another, the UL BW 404 and/or the frequency guard bands 406 may span portions of frequency spectrum that are larger or smaller than a sub-band and/or may be discontinuous from one another. As shown by the example 400, the base station assigns a portion of the sub-band bandwidth to UL communications, instead of the whole bandwidth as shown for the DL SBs 402-1, 402-2, 402-3, and 402-4. However, the base station may alternatively assign a whole bandwidth of a sub-band to UL communications.

In some cases, the base station may indicate, to the Rx UE, to generate the sub-band CLI metrics based at least in part on transmission of a sounding reference signal 408 (SRS 408) (or any reference signal) by a Tx UE. For example, the Tx UE may transmit the SRS 408 using (e.g., within) the UL BW 406. The SRS 408 causes CLI in the DL sub-bands, where the CLI may vary from sub-band to sub-band. For example, the SRS 408 transmission generates first CLI 410-1 in the DL SB 402-1, second CLI 410-2 in the DL SB 402-2, third CLI 410-3 in the DL SB 402-3, and fourth CLI 410-4 in the DL SB 402-4, such as due to leakage of the SRS 408 transmission into the BWs of the DL SBs 402. The base station also communicates, to the Rx UE, CLI configuration information that specifies sub-band CLI measurement resource configurations for measuring a CLI measurement resource 412 (e.g., a CLI-RSSI measurement resource) that spans multiple sub-bands. In one example, a sub-band CLI measurement resource configuration indicates a starting physical resource block (PRB) of the sub-band and an ending PRB of the sub-band. In another example, the sub-band CLI measurement configuration indicates a starting PRB of the sub-band and a number of PRBs. However, the sub-band CLI measurement resource configurations may indicate a variety of information as further described with regard to FIG. 6.

While the example 400 shows the CLI measurement resource 412 spanning sub-bands with usage assignments, a CLI measurement resource may alternatively or additionally span unassigned sub-bands and/or portions of unassigned sub-bands (e.g., sub-bands without usage assignments). The base station, for example, may indicate an unassigned sub-band and/or a portion of an unassigned sub-band in a sub-band CLI measurement configuration. Thus, the base station may indicate, to the Rx UE, to generate sub-band CLI metrics on assigned sub-bands, portions of assigned sub-bands, unassigned sub-bands, portions of unassigned sub-bands, or any combination thereof. The base station may alternatively or additionally indicate, to the Rx UE, to generate sub-band metrics on continuous and/or contiguous sub-bands, discontinuous and/or dis-contiguous sub-bands, or any combination thereof. In this way, sub-band CLI metrics can be determined for assigned sub-bands (e.g., sub-bands used for communication), un-assigned sub-bands (e.g., any arbitrary set of frequency resources, irrespective of whether the frequency resources are used for communication in association with a particular sub-band), or a combination thereof.

Using the CLI configuration information, the base station directs the Rx UE to generate sub-band CLI metrics based at least in part on transmission of the SRS 410 by the Tx UE. A sub-band CLI metric may indicate a measurement value that is specific to a sub-band. For example, a sub-band CLI metric for DL SB 402-1 may indicate a CLI measurement value that is measured only within DL SB 402-1. As shown, the Rx UE generates a first sub-band CLI-RSSI metric 414-1 (SB CLI-RSSI 414-1) based at least in part on a first CLI measurement report configuration indicated by the base station that specifies the portion of the CLI-RSSI resource 412 that occupies the DL SB 402-1. Similarly, the Rx UE generates a second sub-band CLI-RSSI metric 414-2 (SB CLI-RSSI 414-2) based at least in part on a second CLI measurement report configuration that specifies the portion of the CLI-RSSI resource 412 that occupies the DL SB 402-2, a third sub-band CLI-RSSI metric 414-3 (SB CLI-RSSI 414-3) based at least in part on a third CLI measurement report configuration that specifies the portion of the CLI-RSSI resource 412 that occupies the DL SB 402-3, and a fourth sub-band CLI-RSSI metric 414-4 (SB CLI-RSSI 414-4) based at least in part on a fourth CLI measurement report configuration that specifies the portion of the CLI-RSSI resource 412 that occupies the DL SB 402-4. While the example 400 shows the Rx UE generating sub-band CLI-RSSI metrics, the Rx UE may generate other types of sub-band metrics, such as sub-band channel state information (CSI), sub-band channel quality information (CQI), sub-band RSRP, and so forth.

As indicated above, FIG. 4 is provided as an example. Other examples may differ from what is described with regard to FIG. 4.

Figure 5:
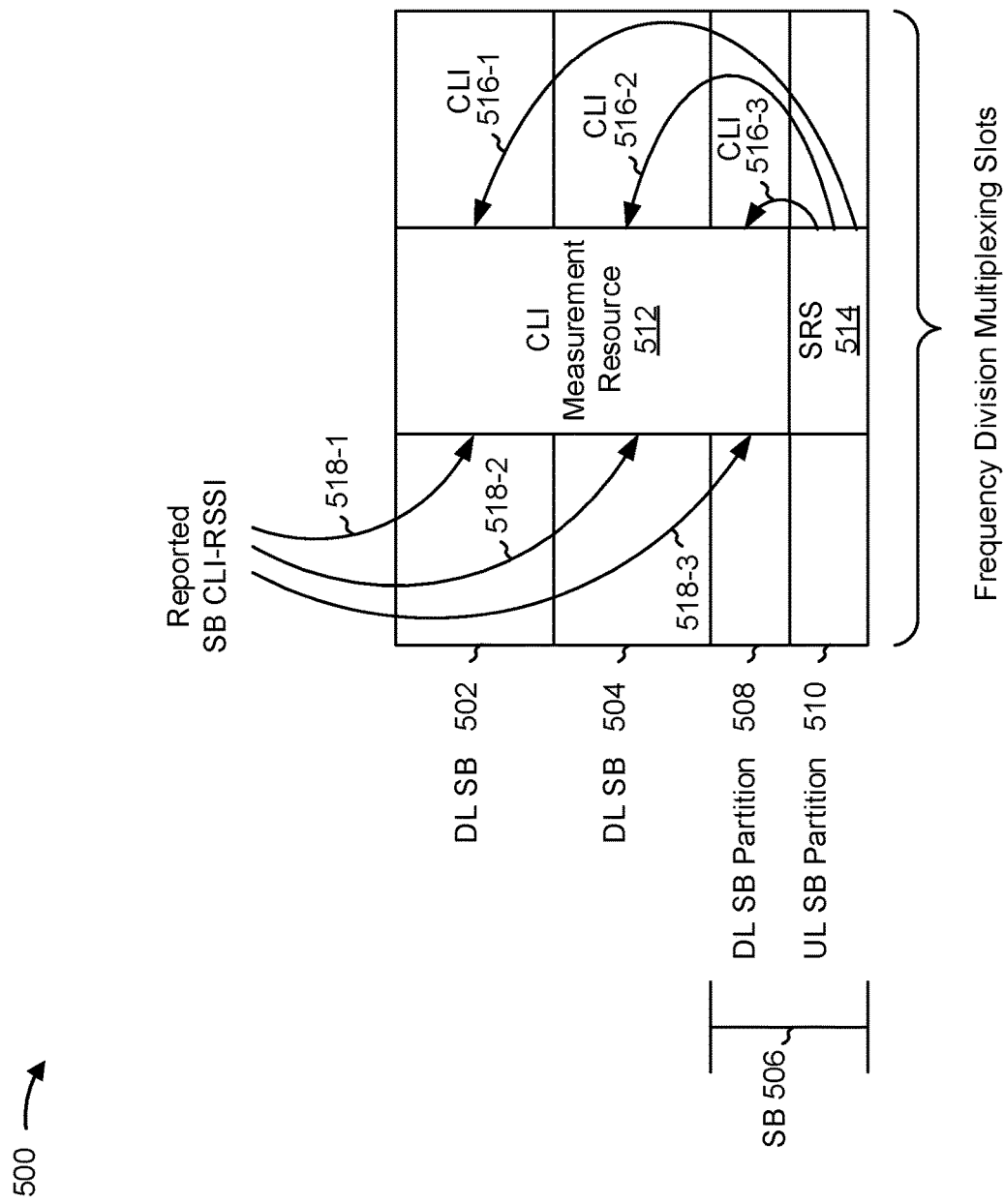
FIG. 5 is a diagram illustrating an example of FDMed slots partitioned into sub-bands, in accordance with the present disclosure.

FIG. 5 is a diagram illustrating an example 500 of FDMed slots partitioned into sub-bands, in accordance with the present disclosure. In the example 500, a single sub-band may have multiple usage assignments. However, the techniques described with regard to the example 500 may also apply to unassigned sub-bands and/or portions of unassigned sub-bands. Furthermore, in some aspects, the sub-bands for which the techniques described herein are performed (e.g., the sub-bands for which sub-band CLI metrics are determined) may be defined after the base station configures a CLI measurement resource. For example, the UE may first receive configuration information configuring a CLI measurement resource, and may later receive CLI configuration information indicating portions of the CLI measurement resource (e.g., a sub-band portion and/or a partition of a sub-band portion) for generating sub-band CLI metrics.

The example 500 includes three sub-bands with usage assignments (e.g., determined by a base station, not shown in FIG. 5): a first sub-band assigned to DL communications (DL SB 502), a second sub-band assigned to DL communications (DL SB 504), and a third sub-band 506 with multiple usage assignments: a downlink sub-band partition 508 (DL SB partition 508) and an uplink sub-band partition 510 (UL SB partition 510).

In aspects, a base station indicates, to a Rx UE (e.g., the UE 302-1 described with regard to FIG. 3B, not shown in FIG. 5) to generate one or more CLI metrics for a CLI measurement resource 512 (e.g., a CLI-RSSI measurement resource, among other examples described herein) that spans multiple sub-bands and/or portions of sub-bands.

As shown by the diagram example 500, the CLI measurement resource 512 spans the DL SB 502, the DL SB 504, and the DL SB partition 508. However, a CLI measurement resource may alternatively or additionally span unassigned sub-bands and/or portions of unassigned sub-bands (e.g., sub-bands without usage assignments). In some cases, the base station may indicate, to the Rx UE, to generate the sub-band CLI metrics based at least in part on transmission of an SRS 514 (or any reference signal) by a Tx UE, where the SRS transmission occupies the UL SB partition 510. The SRS 514 causes CLI in the sub-bands and/or portions of the sub-bands assigned to DL communications, but the SRS 514 may also cause CLI in unassigned sub-bands. The CLI may vary between the different sub-bands and/or portions of a sub-band. To illustrate, the SRS 514 causes first CLI 516-1 in the DL SB 502, second CLI 516-2 in the DL SB 504, and third CLI 516-3 in the DL SB partition 508.

Figure 6:
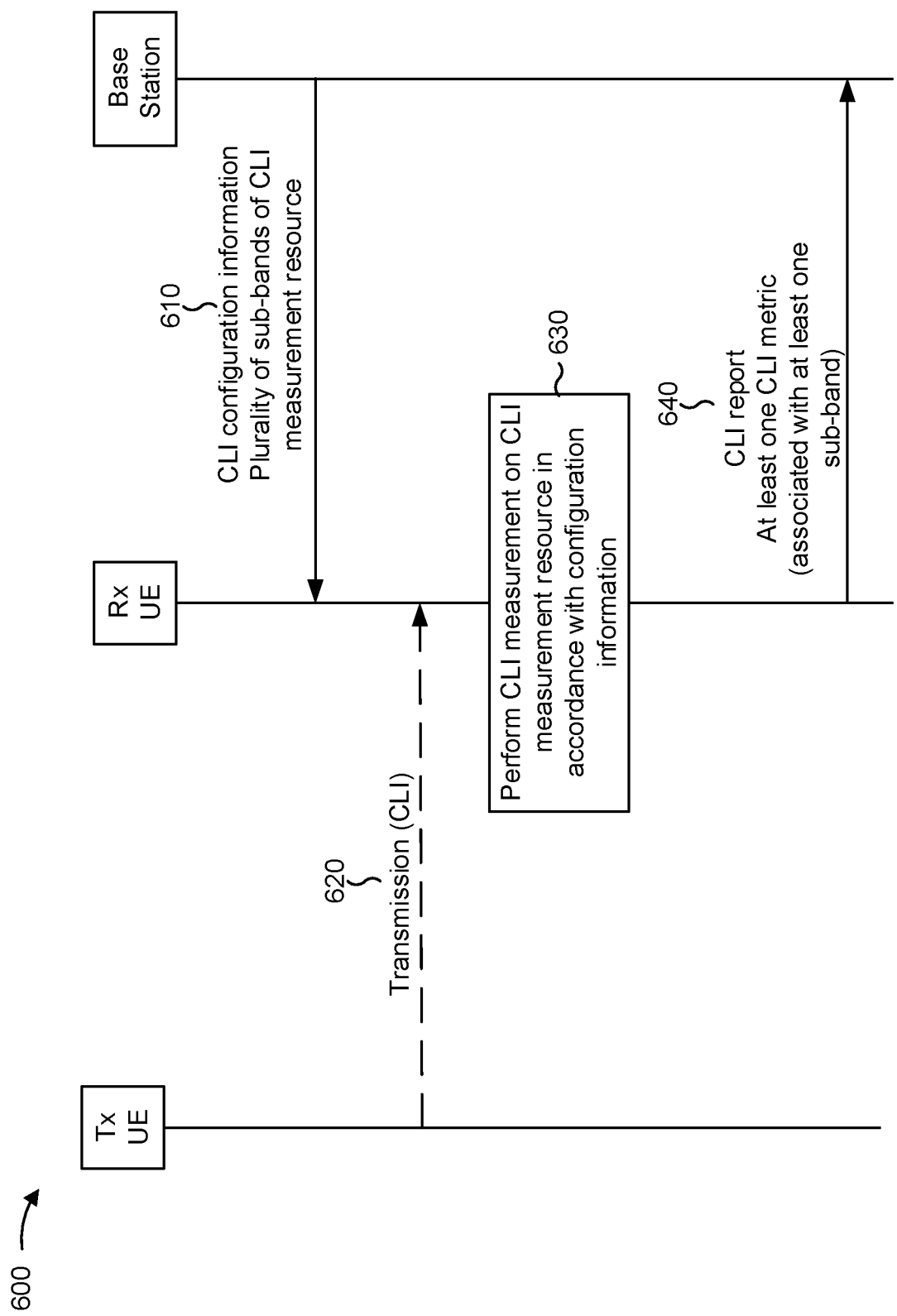
FIG. 6 is a diagram illustrating an example of sub-band based CLI measurement reporting, in accordance with the present disclosure.

Using CLI configuration information as further described with regard to FIG. 6, the base station indicates, to an Rx UE, to generate one or more sub-band CLI metrics. The CLI configuration information may indicate a CLI measurement report configuration for each sub-band and/or portion of a sub-band, such as a first CLI measurement report configuration that indicates to measure a portion of the CLI measurement resource that occupies the DL SB 502, a second CLI measurement report configuration that indicates to measure a portion of the CLI measurement resource that occupies the DL SB 504, and a third CLI measurement report configuration that indicates to measure a portion of the CLI measurement resource that occupies the DL SB partition 508. As further described with regard to FIG. 6, the CLI configuration information may indicate (implicitly or explicitly) to refrain from generating a CLI metric for a sub-band and/or a portion of a sub-band, or may indicate (implicitly or explicitly) to omit the CLI metric from a CLI report transmitted to the base station.

The Rx UE generates a first sub-band CLI-RSSI metric 518-1 (SB CLI-RSSI 518-1) based at least in part on the first CLI measurement report configuration. Similarly, the Rx UE may generate a second sub-band CLI-RSSI metric 518-2 (SB CLI-RSSI 518-2) based at least in part on the second CLI measurement report configuration and may generate a third sub-band CLI-RSSI metric 518-3 (SB CLI-RSSI 518-3) based at least in part on the third CLI measurement report configuration. While the example 500 shows the DL SB 502, the DL SB 504, and the DL SB partition 508 as being continuous and/or contiguous with one another, the base station may direct the Rx UE to generate CLI metrics for sub-bands and/or portions of sub-bands that are discontinuous from one another. While the example 500 shows the Rx UE generating CLI-RSSI metrics based at least in part on sub-bands and/or portions of sub-bands, the Rx UE may generate other types of metrics, such as sub-band CSI, sub-band CQI, sub-band RSRP, and so forth.

As indicated above, FIG. 5 is provided as an example. Other examples may differ from what is described with regard to FIG. 5.

FIG. 6 is a diagram illustrating an example 600 of sub-band based CLI measurement reporting, in accordance with the present disclosure. Example 600 includes an Rx UE (e.g., UE 120, UE 302-1, and/or apparatus 1000 described in connection with FIG. 10), a Tx UE (e.g., UE 120 and/or UE 302-2), and a base station (e.g., BS 110, BS 304, and/or apparatus 1100 described in connection with FIG. 11). The Tx UE is referred to as a Tx UE because the Tx UE transmits a transmission that may cause CLI at the Rx UE.

As shown by reference number 610, the base station may transmit, and the Rx UE may receive, CLI configuration information. The CLI configuration information may indicate a plurality of sub-bands associated with a CLI measurement resource. In some aspects, the CLI configuration information indicates one or more sub-band CLI measurement resource configurations, where each sub-band CLI measurement resource configuration of the one or more sub-band CLI measurement resource configurations specifies a sub-band and/or a portion of a CLI measurement resource to use in generating a CLI metric. In other words, the base station indicates, to the Rx UE, to generate one or more CLI metrics based at least in part on the CLI configuration information and/or the sub-band CLI measurement resource configurations.

A CLI metric may be a measurement value (e.g., 50 decibels) and/or may be based at least in part on a measurement value (e.g., a bit indicator that indicates whether a measurement value has passed or failed a comparison test and/or an outcome of a comparison test). For example, a CLI metric based at least in part on a measurement value may be an averaged measurement value (e.g., an average of measurement values for a plurality of sub-bands and/or an average measurement value over a window of time), a combination of measurement values (e.g., a list of measurement values), a measurement value selected from a plurality of measurement values, or the like. As one example, a CLI metric may be, or may be associated with, a CLI-SRS-RSRP measurement, a CLI RSSI measurement, and/or another type of CLI measurement. In some aspects, a CLI metric may be a single sub-band CLI metric (e.g., a CLI metric generated over a sub-band and/or a portion of a CLI measurement resource). In some aspects, the CLI metric may be a bit indicator that indicates an outcome. Thus, the phrase "CLI metric" may refer to one or more single measurement values, one or more averaged measurement values, one or more sub-band measurement values, one or more averaged sub-band measurement values, one or more comparison test results, and/or one or more other types of CLI metrics, unless explicitly stated otherwise.

In some aspects, the CLI configuration information indicates a first sub-band CLI measurement resource configuration for generating a first CLI metric that is based at least in part on a first sub-band (of the plurality of sub-bands). In other words, a sub-band CLI measurement resource configuration may indicate bounds for generating a CLI metric (e.g., only over the indicated first sub-band), and the bounds may indicate the first sub-band. The CLI configuration information may also indicate at least a second sub-band CLI measurement resource configuration for generating a second CLI metric that is based at least in part on a second sub-band (of the plurality of sub-bands). Thus, the CLI configuration information may indicate multiple CLI measurement resource configurations that, in combination, indicate to generate one or more CLI metrics based on any combination of continuous (e.g., contiguous) sub-bands, discontinuous (e.g., dis-contiguous) sub-bands, portions of sub-bands, assigned sub-bands (e.g., sub-bands with usage assignments determined by the base station), un-assigned sub-bands, and/or portions of frequency spectrum that have not been partitioned into sub-bands or configured as part of a CLI measurement resource. For example, the CLI configuration information may indicate two CLI measurement configurations (e.g., corresponding to a first and second sub-band), may indicate three CLI measurement configurations (e.g., corresponding to a first, second, and third sub-band), may indicate four CLI measurement configurations, and so on.

In some aspects, the base station transmits (and the Rx UE receives) the CLI configuration information in a resource configuration information element (IE). For example, the base station may transmit the CLI configuration information in an SRS resource configuration IE that specifies SRS resources to use for generating CLI measurements (e.g., SRS resources over which the UE is to perform CLI measurements). For example, the SRS resource configuration IE may indicate one or more sub-bands, such as resource blocks to be included in the one or more sub-bands. As another example, the base station may transmit the CLI configuration information in an RSSI resource configuration IE that specifies CLI-RSSI resources to use for generating CLI measurements. For example, the RSSI resource configuration IE may indicate one or more sub-bands, such as resource blocks to be included in the one or more sub-bands. In some aspects, the base station transmits the CLI configuration information in a CLI report configuration IE that specifies one or more resource configurations (e.g., an SRS resource configuration and/or a CLI-RSSI resource configuration) to use for generating CLI measurements and/or that specifies one or more reporting configurations for reporting the CLI measurements. In some aspects, the CLI report configuration IE may be modified relative to another CLI report configuration IE (such as to include the CLI configuration information), or may be a new CLI report configuration IE (e.g., specifically dedicated to the CLI configuration information). In some aspects, the CLI configuration information may be indicated in alternative signaling not described here.

Irrespective of whether the CLI configuration information is indicated in the SRS resource configuration IE, the RSSI resource configuration IE, or the CLI report configuration IE, the CLI configuration information transmitted by the base station may indicate sub-band CLI measurement resource configuration(s) that identify portions of a CLI measurement resource (e.g., a start PRB, an end PRB, and/or a number of PRBs) over which to generate a CLI metric as further described above.

Figure 7A:
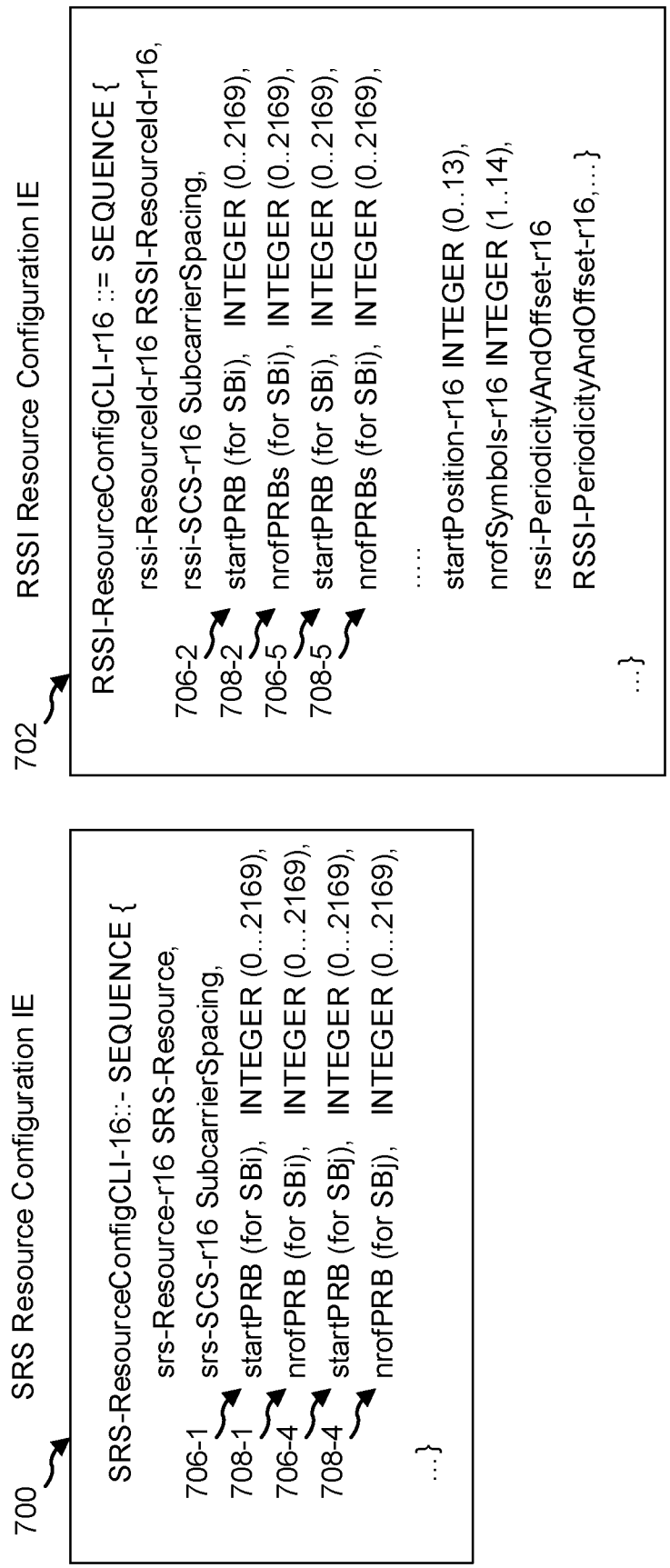

FIGS. 7A and 7B are diagrams illustrating a first example 700 of an SRS resource configuration IE, a second example 702 of an RSSI resource configuration IE, and a third example 704 of a CLI report configuration IE that may be used to indicate CLI configuration information and/or sub-band CLI measurement resource configurations in accordance with the present disclosure.

In some aspects, and irrespective of whether indicated in the SRS resource configuration IE of the example 700, the RSSI resource configuration IE of the example 702, or the CLI report configuration IE of the example 704, a first sub-band CLI measurement resource configuration of the CLI configuration information may indicate an i-th portion (e.g., a first portion) of the CLI measurement resource for generating a first CLI metric (e.g., for SRS reception of CLI measurements), where i is an integer value. The first sub-band CLI measurement resource configuration, for instance, may indicate a starting PRB location and a number of PRBs of the i-th portion. As shown by the example 700, the first sub-band CLI measurement resource configuration of the SRS resource configuration IE includes a first value 706-1, shown as startPRB (for sub-band (SBi)), that indicates the starting PRB location of the i-th portion and a second value 708-1, shown as nrofPRBs (for SBi), that indicates the number of PRBs of the i-th portion. In a similar manner, as shown by the example 702, the first sub-band CLI measurement resource configuration of the RSSI resource configuration IE includes a first value 706-2 that indicates the starting PRB location of the i-th portion and a second value 708-2 that indicates the number of PRBs of the i-th portion. The first sub-band CLI measurement resource configuration of the CLI report configuration IE, as shown by the example 704, includes a first value 706-3 that indicates the starting PRB location of the i-th portion and a second value 708-3 that indicates the number of PRBs of the i-th portion.

The example 700, the example 702, and the example 704 also show, in a similar manner, a second sub-band CLI measurement resource configuration of the CLI configuration information that may indicate a j-th portion (e.g., a second portion) of the CLI measurement resource for generating a second CLI metric (e.g., for SRS reception of CLI measurements), where j is an integer value different from i. To illustrate, as shown by the example 700, the second sub-band CLI measurement resource configuration of the SRS resource configuration IE includes a first value 706-4, shown as startPRB (for SBj), that indicates the starting PRB location of the j-th portion and a second value 708-4, shown as nrofPRBs (for SBj), that indicates the number of PRBs of the j-th portion. In a similar manner, as shown by the example 702, the second sub-band CLI measurement resource configuration of the RSSI resource configuration IE includes a first value 706-5 that indicates the starting PRB location of the j-th portion and a second value 708-5 that indicates the number of PRBs of the j-th portion. The second sub-band CLI measurement resource configuration of the CLI report configuration IE, as shown by the example 704, includes a first value 706-6 that indicates the starting PRB location of the j-th portion and a second value 708-6 that indicates the number of PRBs of the j-th portion.

Alternatively or additionally, each sub-band CLI measurement resource configuration may indicate the sub-band and/or portion of the CLI measurement resource by indicating a starting PRB (e.g., shown as startPRB in the examples 700, 702, and 704) and an ending PRB (endPRB, which is not shown in the examples 700, 702, and 704). It should be noted that the above-described IEs can be used to configure any number of sub-bands.

As indicated above, FIGS. 7A and 7B are provided as examples. Other examples may differ from what is described with regard to FIGS. 7A and 7B.

Returning to FIG. 6, in some aspects, the CLI configuration information transmitted by the base station (and received by the Rx UE) includes a bit map associated with multiple pre-configured sub-bands. A pre-configured sub-band may be considered a particular portion of frequency spectrum (e.g., a particular set of resource blocks in a wideband and/or a particular portion of the set of resource blocks) that has a shared and/or common definition between at least two devices. In some aspects, the base station and the Rx UE may agree upon a set of pre-configured sub-bands by utilizing a common look-up table (LUT), where each entry of the LUT specifies a particular pre-configured sub-band. In some aspects, the base station may indicate the set of the pre-configured sub-bands to the Rx UE using signaling and/or in an IE, such as the SRS resource configuration IE, the RSSI resource configuration IE, the CLI report configuration IE, system information, radio resource control signaling, or the like. In some aspects, each bit of the bit map (e.g., a bit indicator) has an association with a respective pre-configured sub-band in the set of pre-configured sub-bands. The base station may indicate to determine a CLI metric associated with a given pre-configured sub-band by setting the associated bit indicator to a first value (e.g., "1"), or to omit the given pre-configured sub-band from the CLI metric by setting the associated bit indicator to a second value (e.g., "0"). To illustrate, by setting the associated bit indicator to the first value, the base station may indicate to generate a sub-band CLI metric using a particular pre-configured sub-band or to include a sub-band CLI measurement associated with the particular pre-configured sub-band in an averaged CLI metric. In some aspects, the base station may include the bit map in an IE, such as the SRS resource configuration IE, the RSSI resource configuration IE, and/or the CLI report configuration IE.

The CLI configuration information transmitted by the base station (and received by the Rx UE) may include an averaging configuration that indicates to generate, as part of a CLI report, a CLI metric based at least in part on averaging sub-band CLI measurements. To illustrate, the CLI configuration information may indicate a plurality of sub-bands using CLI measurement resource configurations, a CLI reporting configuration, and/or a bit map. The averaging configuration may indicate a set of sub-bands, from the plurality of sub-bands. In some aspects, the averaging configuration may indicate to average sub-band CLI measurements across all the sub-bands in the set of sub-bands. The set of sub-bands indicated by the averaging configuration may include every sub-band in the plurality of sub-bands or a subset of sub-bands in the plurality of sub-bands.

In some aspects, the averaging configuration indicates to average L1 sub-band CLI measurements or to average L3 sub-band CLI measurements. An L1 sub-band CLI measurement provides information about CLI (e.g., a CLI measurement) in a sub-band at a given point in time. An L3 sub-band CLI measurement provides information about CLI in a sub-band over a span of time, such as by using filtering that performs time-averaging of a CLI measurement over the span of time. With regard to L3 sub-band CLI measurements, in some aspects, the averaging configuration may indicate to use common filter coefficients for generating two or more sub-band CLI measurements. In some aspects, the averaging configuration may indicate to use two or more different filter coefficients for generating the two or more sub-band CLI measurements.

In some aspects, the CLI configuration information indicates to generate and transmit a wideband CLI report. A wideband CLI report is a CLI report that includes a single CLI metric for a CLI measurement resource, such as a single CLI metric associated with averaging measurements over all sub-bands in the CLI measurement resource (e.g., over the plurality of sub-bands indicated in the CLI configuration information). As another example, the CLI configuration may indicate to generate the wideband CLI report by averaging measurements over a set of indicated sub-bands.

In some aspects, the CLI configuration information indicates to omit a sub-band and/or a portion of a sub-band from a CLI metric, which may include indicating to refrain from generating a sub-band CLI measurement based at least in part on the sub-band and/or the portion of the sub-band. To illustrate, and with regard to the SB 506 of FIG. 5, a base station may partition a sub-band by assigning a first portion of a sub-band to UL communications, such as for uplink acknowledge/not acknowledged messages (ACK/NACKs) that utilize less bandwidth than a whole of a sub-band, and assigning a second portion of the sub-band to DL communications. In some aspects, the CLI configuration information indicates to omit the partitioned sub-band (e.g., SB 506) from a CLI metric and/or to refrain from generating a sub-band CLI measurement for the partitioned sub-band. In such examples, the UE may not measure CLI on the indicated sub-band, or may average over available sub-bands (e.g., other than the indicated sub-band) for reporting of CLI.

In some aspects, the CLI configuration information indicates a percentage of available resource elements (REs) for a sub-band, and/or indicates to include a CLI metric and/or sub-band CLI measurement for the sub-band in a CLI report if the available REs associated with the sub-band satisfies a threshold (e.g., if a percentage of available REs equals or exceeds the indicated percentage of available REs). Alternatively or additionally, the CLI configuration information may indicate to refrain from measuring and/or to omit, from the CLI report, a CLI metric and/or sub-band CLI measurement for the sub-band if the available REs associated with the sub-band fail to satisfy the threshold (e.g., a percentage of available REs fails to satisfy the threshold). An RE may be considered available if the RE is available for, or configured for, a CLI measurement resource. An RE may be considered unavailable if the RE is unavailable for, or excluded from being configured for, the CLI measurement resource. In some aspects, the CLI configuration information indicates to include an averaged CLI measurement in the CLI report (e.g., using an averaging configuration) and also indicates to include the sub-band CLI measurement in the averaged CLI measurement when the percentage of available REs satisfies the threshold. In one example, the threshold may be 30%.

In some aspects, the CLI configuration information indicates to transmit a CLI report periodically. In such aspects, the UE may generate and transmit the CLI report periodically based on such a configuration. In some other aspects, the CLI configuration information transmitted by the base station indicates to transmit a CLI report aperiodically. As one example, the CLI configuration information indicates a threshold (e.g., a CLI threshold) and a rule for generating and/or transmitting a CLI report. For example, the CLI configuration information may indicate a reporting condition (e.g., a rule) associated with transmitting and/or generating a CLI report, such as a reporting condition based at least in part on the indicated threshold and/or a CLI metric associated with at least one sub-band. To illustrate, the reporting condition may indicate, as the reporting condition, to transmit the CLI report based at least in part on detecting a trigger event, such as detecting that a difference between a current CLI metric (at a current measurement occasion) for a sub-band and a prior CLI metric (at a prior measurement occasion, such as an immediately prior measurement occasion) for the sub-band satisfies a difference threshold (e.g., equal to or greater than the distance threshold), or detecting when the current CLI metric exceeds or falls below a performance threshold.

In some aspects, the reporting condition indicates to only report each CLI metric that satisfies the reporting condition and/or to omit each CLI metric that fails to satisfy the reporting condition. For instance, the CLI configuration information may indicate to only report each sub-band CLI measurement and/or metric that satisfies a threshold. As another example, the CLI configuration information may indicate to only report each sub-band CLI measurement and/or metric that fails to satisfy the threshold. As yet another example, the CLI configuration information may indicate to only report a maximum CLI metric out of a set of CLI metrics generated for the plurality of sub-bands. These examples may reduce signaling overhead as compared to reporting a CLI metric for every sub-band.

In some aspects, the reporting condition indicates to report whether a CLI metric satisfies a CLI threshold. To illustrate, the CLI configuration information may indicate to report a set of CLI metrics (e.g., a set of CLI metrics and/or sub-band CLI metrics for the plurality of sub-bands) and to indicate, for each CLI metric in the set of CLI metrics included in the report, whether the CLI metric satisfies the CLI threshold.

In some aspects, the reporting condition indicates to report a particular number of sub-band CLI metrics out of a set of sub-band CLI metrics. In other words, the reporting condition may indicate to report N sub-band CLI metrics out of M sub-band metrics, where N and M are integer values that can be a same value or different values. To illustrate, the reporting condition may indicate to report the N sub-band CLI metrics, out of a set of M sub-CLI metrics, associated with the N lowest CLI metric values (e.g., the N CLI metric values indicating the least interference), where M>N. As another example, the reporting condition may indicate to report the N highest CLI metric values (e.g., the N CLI metric values indicating the most interference) out of a set of M sub-band CLI metrics, where M>N.

As shown by reference number 620, the Tx UE may optionally perform an UL transmission, further denoted as optional with a dashed line, such as an UL transmission that may cause CLI for downlink reception for the Rx UE. In some aspects, the base station configures the Tx UE to transmit a reference signal. For example, the base station may configure the Tx UE to transmit a reference signal to facilitate sub-band based CLI measurements performed by the Rx UE. In some aspects, the base station configures the Tx UE to transmit an SRS. In some aspects, the base station configures the Tx UE to transmit an uplink DMRS. In some aspects, the base station configures the Tx UE to transmit the reference signal on a particular transmit beam or a particular set of transmit beams (e.g., in sequence), which may facilitate the identification, by the base station, of transmit beams (or combinations of a transmit beam at the Tx UE and a receive beam at the Rx UE) that are suitable, or that are unsuitable, for communication (such as FD communication).

As shown by reference number 630, the Rx UE may perform CLI measurement(s) on a CLI measurement resource in accordance with the CLI configuration information transmitted by the base station (and received by the Rx UE). "Performing a CLI measurement" may include determining a measurement value associated with a CLI measurement resource or a sub-band of the CLI measurement resource. For example, the measurement value may indicate a signal strength, a signal quality, a signal to interference plus noise ratio, or the like, and may be determined for the time and frequency resources included in the CLI measurement resource or the sub-band of the CLI measurement resource.

As one example, the Rx UE identifies, from the CLI configuration information, a plurality of sub-bands associated with a CLI measurement resource. Alternatively or additionally, the Rx UE identifies, from the CLI configuration information, one or more sub-band CLI measurement resource configurations for performing the CLI measurement(s) (e.g., sub-band CLI measurements) and/or for generating a CLI report. To illustrate, the Rx UE identifies at least a first sub-band CLI measurement resource configuration associated with a first sub-band of the plurality of sub-bands, and generates a first CLI metric that is based at least in part on a first sub-band and/or the CLI configuration information. Similarly, the Rx UE identifies a second sub-band CLI measurement resource configuration associated with a second sub-band and generates a second CLI metric that is based at least in part on the second sub-band and/or the CLI configuration information.

In some aspects, the Rx UE generates a CLI report that includes information based on performing the CLI measurements. As one example, the Rx UE generates a sub-band CLI measurement for each sub-band in the plurality of sub-bands, and includes each sub-band CLI measurement in the CLI report. A CLI report that includes a sub-band CLI measurement for each sub-band in the plurality of sub-bands may alternatively be referred to as a per-sub-band (per-SB) CLI report. As another example, the Rx UE generates a wideband CLI report that includes a single CLI metric for a CLI measurement resource as described above (e.g., which may exclude one or more sub-bands from being measured or used in indicating the single CLI metrics).

In some aspects, the Rx UE identifies which pre-configured sub-bands to include or omit from a CLI metric, such as by analyzing a bit map and/or a LUT as further described above. For example, the Rx UE may generate a sub-band CLI metric using an identified pre-configured sub-band. Alternatively or additionally, the Rx UE may include a sub-band CLI measurement associated with the identified pre-configured sub-band in an averaged CLI metric. The Rx UE may include the sub-band CLI metric and/or averaged CLI metric in a CLI report in accordance with the CLI configuration information.

In some aspects, the Rx UE generates the CLI report (and/or CLI metrics included in the CLI report) based at least in part on an averaging configuration indicated by the CLI configuration information. For instance, the Rx UE includes, in an averaged CLI measurement and based on the averaging configuration, sub-band CLI measurements for each sub-band in a set of sub-bands. The set of sub-bands may include every sub-band in the plurality of sub-bands or a subset of sub-bands in the plurality of sub-bands.

In some aspects, the Rx UE generates, as a CLI metric and based at least in part on the averaging configuration, an averaged CLI measurement using L1 sub-band CLI measurements or L3 sub-band CLI measurements. With regard to generating L3 sub-band CLI measurements, the Rx UE may generate two or more L3 sub-band CLI measurements using common filter coefficients, or using two or more different filter coefficients, as indicated by the averaging configuration.

In some aspects, the Rx UE omits a sub-band CLI measurement from a CLI metric and/or CLI report as indicated by the averaging configuration and/or the CLI configuration information. For example, the Rx UE may identify, from the CLI configuration information, a percentage of available REs and determine whether to include a sub-band CLI metric for a particular sub-band in the CLI report based at least in part on whether the REs of the particular sub-band satsify the percentage of available REs. Alternatively or additionally, the Rx UE determines to omit the sub-band CLI metric for the particular sub-band from the CLI report if the REs of the particular sub-band fail to satisfy the percentage of available REs. As another example, the Rx UE includes, based at least in part on the averaging configuration, a sub-band CLI measurement associated with the particular sub-band in a CLI metric when the REs for the particular sub-band satisfy the percentage of available REs.

In some aspects, the Rx UE generates the CLI report in accordance with the CLI configuration information. For example, the RX UE only reports, in the CLI report and based on the CLI configuration information, each CLI metric that satisfies a threshold, each CLI metric that fails to satisfy the threshold, or only a maximum CLI metric out of a set of CLI metrics generated for the plurality of sub-bands. Thus, the Rx UE may omit some CLI metrics from the CLI report based on the CLI configuration information. Alternatively or additionally, the Rx UE may indicate, in the CLI report, a number of CLI metrics that are included in the CLI report, such as in a header of the CLI report.

In some aspects, the Rx UE indicates, in the CLI report, whether each sub-band CLI metric included in the CLI report satisfies a CLI threshold. As one example, the Rx UE includes, in the CLI report, a sub-band CLI metric for each sub-band included in the plurality of sub-bands indicated by the CLI configuration information. Alternatively or additionally, the Rx UE may indicate, in the CLI report, whether each sub-band CLI metric satisfies a CLI threshold by setting a bit indicator associated with the sub-band CLI metric to a first value (e.g., "1") or a second value (e.g., "0"). The first value may indicate, for example, that the sub-band CLI metric satisfies the CLI threshold. The second value may indicate, for example, that the sub-band CLI metric does not satisfy the CLI threshold. Thus, to reduce a size of the CLI report, the Rx UE may only include bit indicators of whether each sub-band CLI metric satisfies a CLI threshold in the CLI report.

The Rx UE may indicate, in a header of the CLI report, a total number of CLI metrics and/or sub-band CLI measurements included in the CLI report. This allows the base station to decode the CLI report based on the indicated total number of CLI metrics.

In some aspects, the Rx UE indicates, in the CLI report, a particular number of sub-band CLI metrics in accordance with the CLI configuration information, such as N sub-band CLI metrics out of M sub-band metrics as further described above.

As shown by reference number 640, the Rx UE transmits (and the base station receives) a CLI report that indicates at least one CLI metric (associated with at least one sub-band). In some aspects, the Rx UE transmits the CLI report periodically or aperiodically, in accordance with the CLI configuration information. For example, the Rx UE transmits the CLI report in accordance with a reporting condition (e.g., a rule) and/or based at least in part on detecting a trigger event as further described above. In some aspects, the base station may determine a minimum required guard band between the Rx UE and the Tx UE based at least in part on the CLI report, such as to maximize spectrum usage of the Rx UE and the Tx UE.

Sub-band based CLI measurement reporting enables a base station to configure an Rx UE to generate CLI measurements at a sub-band granularity. The CLI measurements at a sub-band granularity also enable the base station to optimize air interface resource assignments to mitigate CLI observed at an Rx UE, which reduces waste and increases a quantity of UEs that the base station can support. Mitigating the CLI observed at the Rx UE also reduces data recovery errors and improves data throughput at the Rx UE.

As indicated above, FIG. 6 is provided as an example. Other examples may differ from what is described with regard to FIG. 6.

Figure 8:
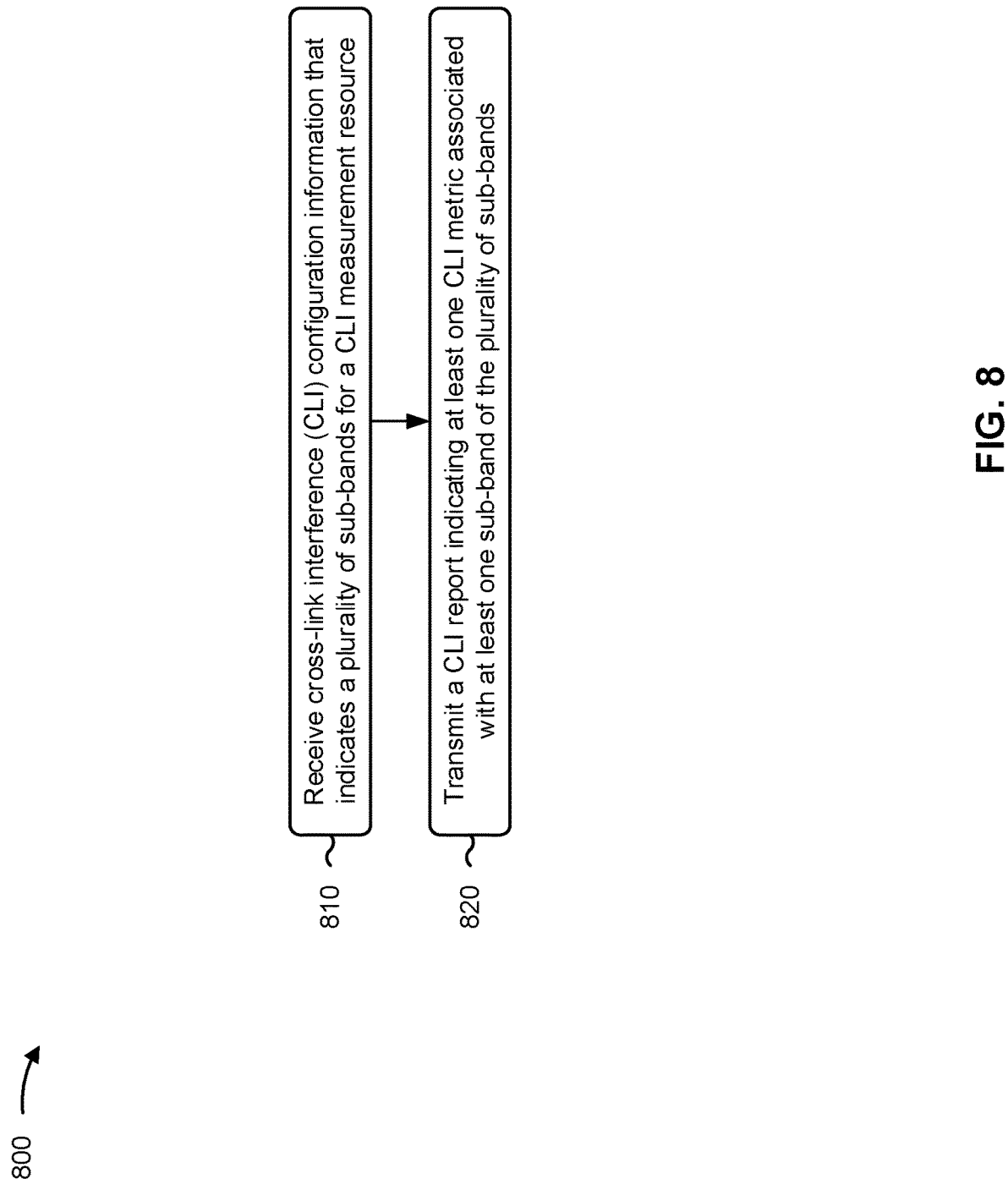
FIG. 8 is a diagram illustrating an example process performed in accordance with the present disclosure.

FIG. 8 is a diagram illustrating an example process 800 performed, for example, by a UE, in accordance with the present disclosure. Example process 800 is an example where the UE (e.g., UE 120) performs operations associated with generating a sub-band based CLI report.

As shown in FIG. 8, in some aspects, process 800 may include receiving CLI configuration information that indicates a plurality of sub-bands for a CLI measurement resource (block 810). For example, the UE (e.g., using communication manager 140 and/or reception component 1002, depicted in FIG. 10) may receive CLI configuration information that indicates a plurality of sub-bands for a CLI measurement resource, as described above.

As further shown in FIG. 8, in some aspects, process 800 may include transmitting a CLI report indicating at least one CLI metric associated with at least one sub-band of the plurality of sub-bands (block 820). For example, the UE (e.g., using communication manager 140 and/or transmission component 1004, depicted in FIG. 10) may transmit a CLI report indicating at least one CLI metric associated with at least one sub-band of the plurality of sub-bands, as described above. By receiving the CLI configuration information that indicates to generate a sub-band CLI metric and/or measurement, the UE may provide a base station with CLI results at a sub-band granularity, which enables the base station to improve CLI mitigation techniques (e.g., through air interface resource assignment), improve signal quality at the UE, reduce recovery errors at the UE, and/or increase data throughput at the UE.

Process 800 may include additional aspects, such as any single aspect or any combination of aspects described below and/or in connection with one or more other processes described elsewhere herein.

In a first aspect, the CLI configuration information comprises at least a first sub-band CLI measurement resource configuration for sounding reference signal (SRS) reception in a first sub-band of the plurality of sub-bands, and a second sub-band CLI measurement resource configuration for SRS reception in a second sub-band of the plurality of sub-bands.

In a second aspect, alone or in combination with the first aspect, the CLI configuration information indicates, for each sub-band of the plurality of sub-bands, a start PRB and a number of PRBs.

In a third aspect, alone or in combination with one or more of the first and second aspects, the CLI configuration information indicates, for each sub-band of the plurality of sub-bands, a start PRB and an end PRB.

In a fourth aspect, alone or in combination with one or more of the first through third aspects, the CLI configuration information comprises a bit map associated with a set of pre-configured sub-bands, and wherein the CLI configuration information indicates to report the at least one CLI metric associated with the at least one sub-band based at least in part on the bit map. By using pre-configured sub-bands and/or a bit map to indicate the pre-configured sub-bands, a UE can receive the CLI configuration information in a quick and efficient manner (e.g., using less resources which can be transmitted and received more quickly).

In a fifth aspect, alone or in combination with one or more of the first through fourth aspects, process 800 includes receiving an indication of the set of pre-configured sub-bands. By using pre-configured sub-bands, configuration signaling is reduced relative to explicit configuration of sub-bands.

In a sixth aspect, alone or in combination with one or more of the first through fifth aspects, receiving the CLI configuration information comprises receiving the CLI configuration information in at least one of an SRS resource configuration IE, a RSSI resource configuration CLI IE, or a L1 CLI report configuration IE.

In a seventh aspect, alone or in combination with one or more of the first through sixth aspects, the CLI configuration information indicates an averaging configuration for generating at least part of the CLI report.

In an eighth aspect, alone or in combination with one or more of the first through seventh aspects, the CLI configuration information indicates a set of sub-bands of the plurality of sub-bands, and wherein the averaging configuration indicates to average sub-band CLI measurements across all sub-bands in the set of sub-bands.

In a ninth aspect, alone or in combination with one or more of the first through eighth aspects, the set of sub-bands comprises every sub-band in the plurality of sub-bands, or a subset of sub-bands in the plurality of sub-bands.

In a tenth aspect, alone or in combination with one or more of the first through ninth aspects, the averaging configuration indicates to average L1 sub-band CLI measurements, or L3 sub-band CLI measurements.

In an eleventh aspect, alone or in combination with one or more of the first through tenth aspects, the averaging configuration indicates to use, for generating the L3 sub-band CLI measurements, one of common filter coefficients for two or more sub-band CLI measurements, or two or more different filter coefficients for the two or more sub-band CLI measurements.

In a twelfth aspect, alone or in combination with one or more of the first through eleventh aspects, the CLI configuration information indicates to omit a CLI metric for a sub-band, in the plurality of sub-bands, from the CLI report. This improves the CLI metrics reported by the UE by removing a sub-band (or a portion of the sub-band) that may be unavailable for CLI measurement resource configuration and/or that may be assigned to uplink transmissions.

In a thirteenth aspect, alone or in combination with one or more of the first through twelfth aspects, process 800 includes receiving an indication of a percentage of available REs for a sub-band in the plurality of sub-bands.

In a fourteenth aspect, alone or in combination with one or more of the first through thirteenth aspects, process 800 includes including, in the CLI report, a CLI metric for the sub-band in the CLI report when the percentage of available REs satisfies a threshold.

In a fifteenth aspect, alone or in combination with one or more of the first through fourteenth aspects, process 800 includes including an averaged CLI measurement in the CLI report, wherein the averaged CLI measurement is based at least in part on a CLI measurement for the sub-band when the percentage of available REs satisfies the threshold.

In a sixteenth aspect, alone or in combination with one or more of the first through fifteenth aspects, the CLI report includes a respective sub-band CLI metric for each sub-band of the plurality of sub-bands.

In a seventeenth aspect, alone or in combination with one or more of the first through sixteenth aspects, transmitting the CLI report comprises transmitting the CLI report periodically, or transmitting the CLI report aperiodically.

In an eighteenth aspect, alone or in combination with one or more of the first through seventeenth aspects, transmitting the CLI report comprises transmitting information indicating a number of sub-band CLI metrics included in the CLI report. This provides a receiving device, such as a base station, with information to properly recover information included in the CLI report, which may have variable length based at least in part on what sub-band CLI metrics the UE determines to include in the CLI report.

In a nineteenth aspect, alone or in combination with one or more of the first through eighteenth aspects, the CLI configuration information indicates a reporting condition, and wherein the at least one CLI metric is included in the CLI report based at least in part on the at least one CLI metric satisfying the reporting condition.

In a twentieth aspect, alone or in combination with one or more of the first through nineteenth aspects, the CLI report includes each sub-band CLI metric that satisfies the reporting condition and the CLI report omits each CLI metric that fails to satisfy the reporting condition.

In a twenty-first aspect, alone or in combination with one or more of the first through twentieth aspects, the reporting condition indicates to report one of each sub-band CLI metric that satisfies a threshold, each sub-band CLI metric that fails to satisfy the threshold, or a maximum CLI metric out of a set of CLI metrics generated for the plurality of sub-bands.

In a twenty-second aspect, alone or in combination with one or more of the first through twenty-first aspects, the reporting condition indicates a CLI threshold, and wherein the CLI report indicates, for each CLI metric in a set of CLI metrics, whether the CLI metric satisfies the CLI threshold.

In a twenty-third aspect, alone or in combination with one or more of the first through twenty-second aspects, the CLI report indicates whether the CLI metric satisfies the CLI threshold using a bit indicator.

In a twenty-fourth aspect, alone or in combination with one or more of the first through twenty-third aspects, the reporting condition indicates to report a particular number of sub-band CLI metrics out of a set of sub-band CLI metrics associated with the plurality of sub-bands.

In a twenty-fifth aspect, alone or in combination with one or more of the first through twenty-fourth aspects, the reporting condition indicates to report, as the particular number of sub-band CLI metrics, one of sub-band CLI metrics associated with the particular number of lowest CLI metric values in the set of sub-band CLI metrics, or sub-band metrics associated with the particular number of highest CLI metric values in the set of sub-band CLI metrics.

In a twenty-sixth aspect, alone or in combination with one or more of the first through twenty-fifth aspects, the reporting condition indicates to transmit the CLI report based at least in part on a trigger event.

In a twenty-seventh aspect, alone or in combination with one or more of the first through twenty-sixth aspects, the trigger event comprises one of a difference between a current CLI metric for a sub-band and a prior CLI metric for the sub-band satisfying a difference threshold, or the current CLI metric satisfying a performance threshold. Reporting CLI metrics based on a trigger event may reduce a number of communications transmitted between the UE and a base station, which preserves air interface resources of the network for other communications. Reporting CLI metrics based on a trigger event may also preserve a battery life of the UE by reducing a number of transmissions generated by the UE.

In a twenty-eighth aspect, alone or in combination with one or more of the first through twenty-seventh aspects, the CLI configuration information indicates, in the plurality of sub-bands, to measure two or more continuous sub-bands or two or more discontinuous sub-bands.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
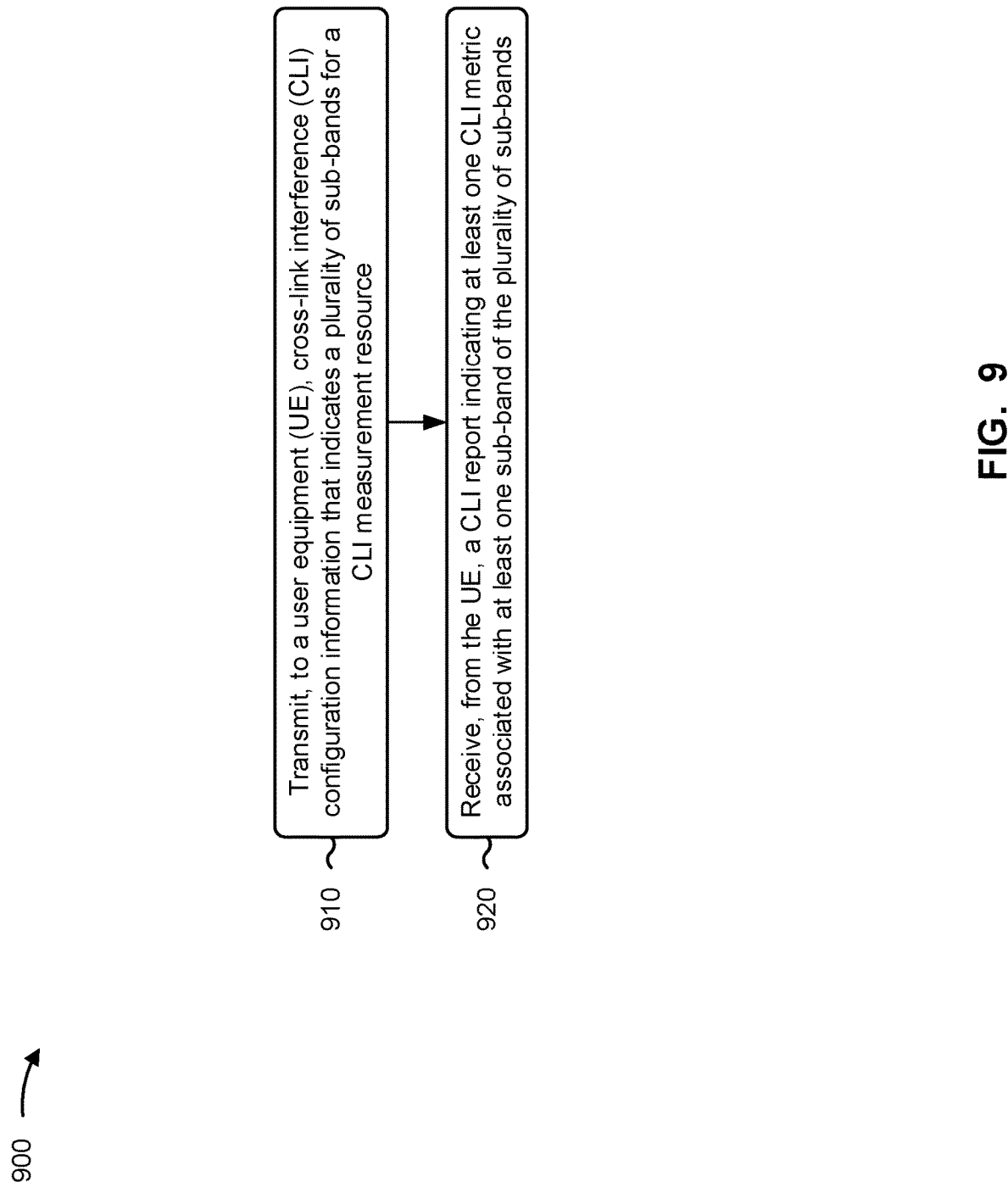
FIG. 9 is a diagram illustrating an example process performed in accordance with the present disclosure.

FIG. 9 is a diagram illustrating an example process 900 performed, for example, by a base station, in accordance with the present disclosure. Example process 900 is an example where the base station (e.g., base station 110) performs operations associated with configuring a UE to transmit sub-band based CLI reports.

As shown in FIG. 9, in some aspects, process 900 may include transmitting, to a UE, CLI configuration information that indicates a plurality of sub-bands for a CLI measurement resource (block 910). For example, the base station (e.g., using communication manager 150 and/or transmission component 1104, depicted in FIG. 11) may transmit, to a UE, CLI configuration information that indicates a plurality of sub-bands for a CLI measurement resource, as described above.

As further shown in FIG. 9, in some aspects, process 900 may include receiving, from the UE, a CLI report indicating at least one CLI metric associated with at least one sub-band of the plurality of sub-bands (block 920). For example, the base station (e.g., using communication manager 150 and/or reception component 1102, depicted in FIG. 11) may receive, from the UE, a CLI report indicating at least one CLI metric associated with at least one sub-band of the plurality of sub-bands, as described above. Sub-band based CLI measurement reporting provides the base station with information about how CLI affects each particular sub-band and, subsequently, enables the base station to determine modifications to air interface resource assignments at a sub-band granularity. Modifications at a sub-band granularity help mitigate CLI at the Rx UE and, in turn, reduce recovery errors and improves data throughput at the Rx UE. Sub-band based CLI measurement reporting also allows the base station to optimize air interface resource assignments, which reduces waste and increases a quantity of UEs that the base station can support.

Process 900 may include additional aspects, such as any single aspect or any combination of aspects described below and/or in connection with one or more other processes described elsewhere herein.

In a first aspect, the CLI configuration information comprises at least a first sub-band CLI measurement resource configuration for SRS reception in a first sub-band of the plurality of sub-bands, and a second sub-band CLI measurement resource configuration for SRS reception in a second sub-band of the plurality of sub-bands.

In a second aspect, alone or in combination with the first aspect, the CLI configuration information indicates, for each sub-band of the plurality of sub-bands, a start PRB and a number of PRBs.

In a third aspect, alone or in combination with one or more of the first and second aspects, the CLI configuration information indicates, for each sub-band of the plurality of sub-bands, a start PRB and an end PRB.

In a fourth aspect, alone or in combination with one or more of the first through third aspects, the CLI configuration information comprises a bit map associated with a set of pre-configured sub-bands, and wherein the CLI configuration information indicates to report the at least one CLI metric associated with the at least one sub-band based at least in part on the bit map.

In a fifth aspect, alone or in combination with one or more of the first through fourth aspects, process 900 includes transmitting, to the UE, an indication of the set of pre-configured sub-bands.

In a sixth aspect, alone or in combination with one or more of the first through fifth aspects, transmitting the CLI configuration information comprises transmitting the CLI configuration information in at least one of an SRS resource configuration IE, an RSSI resource configuration IE, or a L1 CLI report configuration IE.

In a seventh aspect, alone or in combination with one or more of the first through sixth aspects, the CLI configuration information indicates an averaging configuration for generating at least part of the CLI report.

In an eighth aspect, alone or in combination with one or more of the first through seventh aspects, the CLI configuration information indicates a set of sub-bands of the plurality of sub-bands, and wherein the averaging configuration indicates to average sub-band CLI measurements across all sub-bands in the set of sub-bands.

In a ninth aspect, alone or in combination with one or more of the first through eighth aspects, the set of sub-bands comprises every sub-band in the plurality of sub-bands, or a subset of sub-bands in the plurality of sub-bands.

In a tenth aspect, alone or in combination with one or more of the first through ninth aspects, the averaging configuration indicates to average L1 sub-band CLI measurements, or L3 sub-band CLI measurements.

In an eleventh aspect, alone or in combination with one or more of the first through tenth aspects, the averaging configuration indicates to use, for generating the L3 sub-band CLI measurements, one of common filter coefficients for two or more sub-band CLI measurements, or two or more different filter coefficients for the two or more sub-band CLI measurements.

In a twelfth aspect, alone or in combination with one or more of the first through eleventh aspects, the CLI configuration information indicates to omit a CLI metric for a sub-band, in the plurality of sub-bands, from the CLI report.

In a thirteenth aspect, alone or in combination with one or more of the first through twelfth aspects, process 900 includes transmitting, to the UE, an indication of a percentage of available REs for a sub-band in the plurality of sub-bands.

In a fourteenth aspect, alone or in combination with one or more of the first through thirteenth aspects, process 900 includes indicating, in the CLI configuration information, to report a CLI metric for the sub-band in the CLI report when the percentage of available REs satisfies a threshold.

In a fifteenth aspect, alone or in combination with one or more of the first through fourteenth aspects, process 900 includes indicating, in the CLI configuration information, to include, in the CLI report, an averaged CLI measurement that is based at least in part on a CLI measurement for the sub-band when the percentage of available REs satisfies the threshold.

In a sixteenth aspect, alone or in combination with one or more of the first through fifteenth aspects, the CLI report includes a respective sub-band CLI metric for each sub-band of the plurality of sub-bands.

In a seventeenth aspect, alone or in combination with one or more of the first through sixteenth aspects, receiving the CLI report comprises receiving the CLI report periodically, or receiving the CLI report aperiodically.

In an eighteenth aspect, alone or in combination with one or more of the first through seventeenth aspects, the CLI report comprises information indicating a number of sub-band CLI metrics included in the CLI report.

In a nineteenth aspect, alone or in combination with one or more of the first through eighteenth aspects, the CLI configuration information indicates a reporting condition, and wherein the CLI configuration information further indicates to include the at least one CLI metric in the CLI report based at least in part on the at least one CLI metric satisfying the reporting condition.

In a twentieth aspect, alone or in combination with one or more of the first through nineteenth aspects, the CLI report includes each sub-band CLI metric that satisfies the reporting condition and the CLI report omits each CLI metric that fails to satisfy the reporting condition. This improves the CLI metrics reported by the UE by removing a sub-band (or a portion of the sub-band) that may be unavailable for CLI measurement resource configuration and/or that may be assigned to uplink transmissions.

In a twenty-first aspect, alone or in combination with one or more of the first through twentieth aspects, the reporting condition indicates to report one of each sub-band CLI metric that satisfies a threshold, each sub-band CLI metric that fails to satisfy the threshold, or a maximum CLI metric out of a set of CLI metrics generated for the plurality of sub-bands.

In a twenty-second aspect, alone or in combination with one or more of the first through twenty-first aspects, the reporting condition indicates a CLI threshold, and wherein the CLI report indicates, for each CLI metric in a set of CLI metrics, whether the CLI metric satisfies the CLI threshold.

In a twenty-third aspect, alone or in combination with one or more of the first through twenty-second aspects, the CLI report indicates whether the CLI metric satisfies the CLI threshold using a bit indicator.

In a twenty-fourth aspect, alone or in combination with one or more of the first through twenty-third aspects, the reporting condition indicates to report a particular number of sub-band CLI metrics out of a set of sub-band CLI metrics associated with the plurality of sub-bands.

In a twenty-fifth aspect, alone or in combination with one or more of the first through twenty-fourth aspects, the reporting condition indicates to report, as the particular number of sub-band CLI metrics, one of sub-band CLI metrics associated with the particular number of lowest CLI metric values in the set of sub-band CLI metrics, or sub-band metrics associated with the particular number of highest CLI metric values in the set of sub-band CLI metrics.

In a twenty-sixth aspect, alone or in combination with one or more of the first through twenty-fifth aspects, the reporting condition indicates to transmit the CLI report based at least in part on a trigger event. Directing a UE to reporting CLI metrics based on a trigger event may reduce a number of communications transmitted between the UE and a base station, which preserves air interface resources of the wireless network for other communications.

In a twenty-seventh aspect, alone or in combination with one or more of the first through twenty-sixth aspects, the trigger event comprises one of a difference between a current CLI metric for a sub-band and a prior CLI metric for the sub-band satisfying a difference threshold, or the current CLI metric satisfying a performance threshold.

In a twenty-eighth aspect, alone or in combination with one or more of the first through twenty-seventh aspects, the CLI configuration information indicates, in the plurality of sub-bands, to measure two continuous sub-bands or two discontinuous sub-bands.

In a twenty-ninth aspect, alone or in combination with one or more of the first through twenty-eighth aspects, the UE is a first UE and the method comprises selecting, based at least in part on the CLI report, a minimum required guard band between downlink transmissions to the first UE and uplink transmissions from a second UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
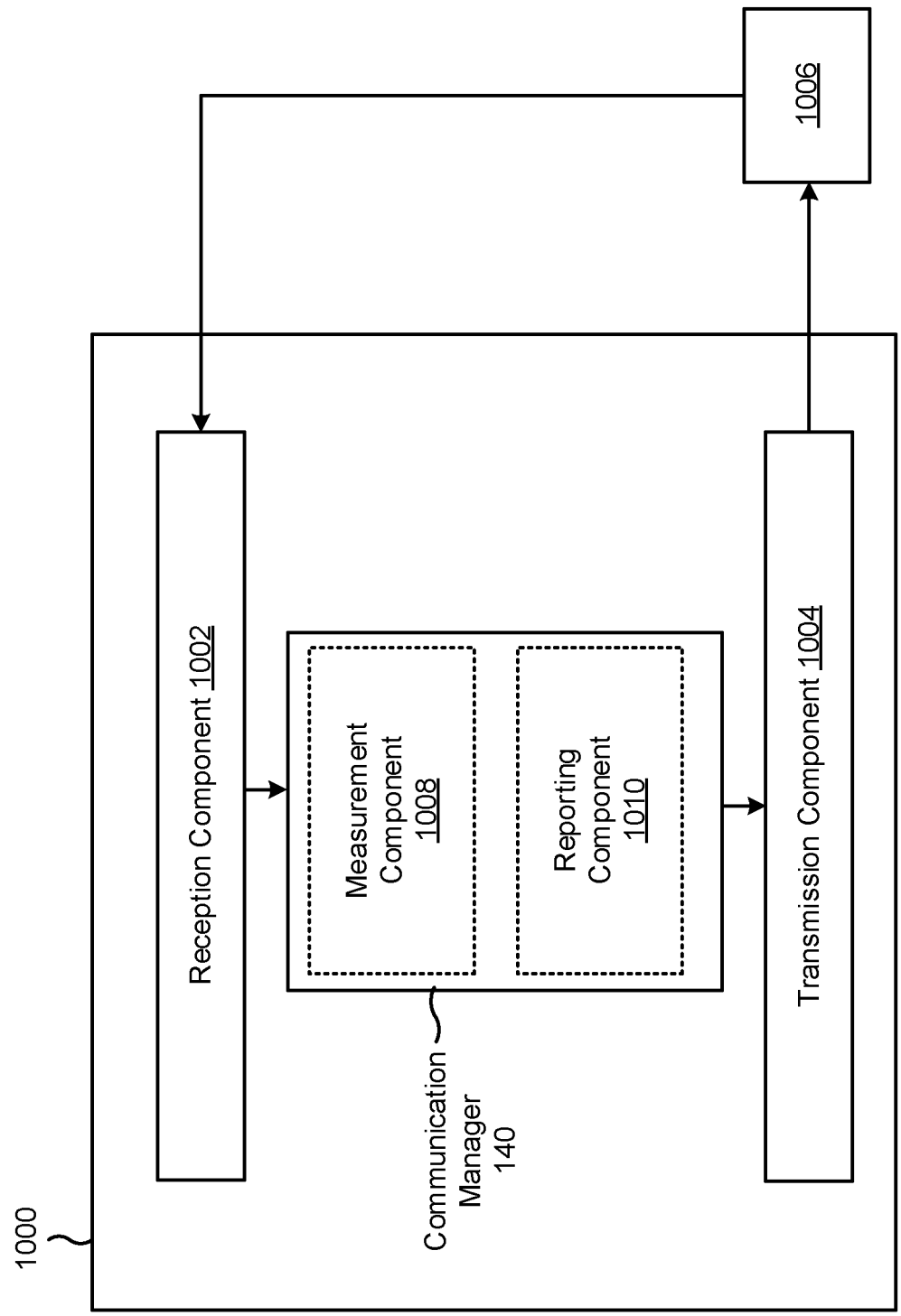
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a measurement component 1008, a reporting component 1010, among other examples.

In some aspects, the apparatus 1000 may be configured to perform one or more operations described herein in connection with FIGS. 4-7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive CLI configuration information that indicates a plurality of sub-bands for a CLI measurement resource. The transmission component 1004 may transmit a CLI report indicating at least one CLI metric associated with at least one sub-band of the plurality of sub-bands. The measurement component 1008 may measure CLI associated with the at least one sub-band. The reporting component 1010 may generate the CLI report.

The reception component 1002 may receive an indication of the set of pre-configured sub-bands.

The reception component 1002 may receive an indication of a percentage of available REs for a sub-band in the plurality of sub-bands.

The transmission component 1004 may include, in the CLI report, a CLI metric for the sub-band in the CLI report when the percentage of available REs satisfies a threshold.

The measurement component 1008 may include an averaged CLI measurement in the CLI report, wherein the averaged CLI measurement is based at least in part on a CLI measurement for the sub-band when the percentage of available REs satisfies the threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
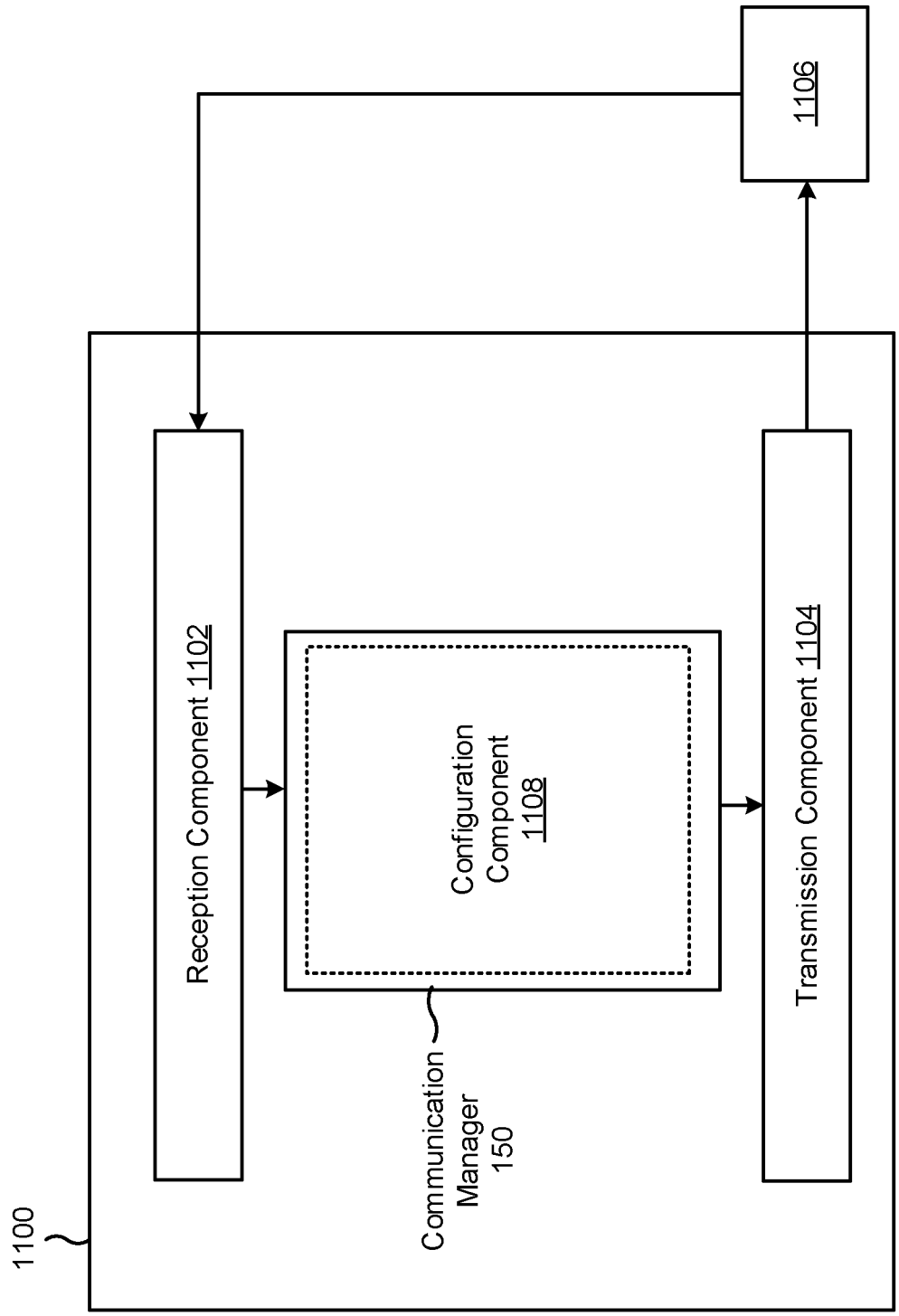
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a configuration component 1108, among other examples.

In some aspects, the apparatus 1100 may be configured to perform one or more operations described herein in connection with FIGS. 4-7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 or the configuration component 1108 may transmit, to a user equipment (UE), cross-link interference (CLI) configuration information that indicates a plurality of sub-bands for a CLI measurement resource. The reception component 1102 may receive, from the UE, a CLI report indicating at least one CLI metric associated with at least one sub-band of the plurality of sub-bands.

The transmission component 1104 may transmit, to the UE, an indication of the set of pre-configured sub-bands.

The transmission component 1104 may transmit, to the UE, an indication of a percentage of available resource elements (REs) for a sub-band in the plurality of sub-bands.

The configuration component 1108 may indicate, in the CLI configuration information, to report a CLI metric for the sub-band in the CLI report when the percentage of available REs satisfies a threshold.

The configuration component 1108 may indicate, in the CLI configuration information, to include, in the CLI report, an averaged CLI measurement that is based at least in part on a CLI measurement for the sub-band when the percentage of available REs satisfies the threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving cross-link interference (CLI) configuration information that indicates a plurality of sub-bands for a CLI measurement resource; and transmitting a CLI report indicating at least one CLI metric associated with at least one sub-band of the plurality of sub-bands.

Aspect 2: The method of Aspect 1, wherein the CLI configuration information comprises at least: a first sub-band CLI measurement resource configuration for sounding reference signal (SRS) reception in a first sub-band of the plurality of sub-bands, and a second sub-band CLI measurement resource configuration for SRS reception in a second sub-band of the plurality of sub-bands.

Aspect 3: The method of any of Aspects 1-2, wherein the CLI configuration information indicates, for each sub-band of the plurality of sub-bands, a start physical resource block (PRB) and a number of physical resource blocks (PRBs).

Aspect 4: The method of any of Aspects 1-3, wherein the CLI configuration information indicates, for each sub-band of the plurality of sub-bands, a start physical resource block (PRB) and an end PRB.

Aspect 5: The method of any of Aspects 1-4, wherein the CLI configuration information comprises a bit map associated with a set of pre-configured sub-bands, and wherein the CLI configuration information indicates to report the at least one CLI metric associated with the at least one sub-band based at least in part on the bit map.

Aspect 6: The method of Aspect 5, further comprising receiving an indication of the set of pre-configured sub-bands.

Aspect 7: The method of any of Aspects 1-6, wherein receiving the CLI configuration information comprises: receiving the CLI configuration information in at least one of: a sounding reference signal (SRS) resource configuration CLI information element (IE); a received signal strength indicator (RSSI) resource configuration CLI IE; or a layer 1 (L1) CLI report configuration IE.

Aspect 8: The method of any of Aspects 1-7, wherein the CLI configuration information indicates an averaging configuration for generating at least part of the CLI report.

Aspect 9: The method of Aspect 8, wherein the CLI configuration information indicates a set of sub-bands of the plurality of sub-bands, and wherein the averaging configuration indicates to average sub-band CLI measurements across all sub-bands in the set of sub-bands.

Aspect 10: The method of Aspect 9, wherein the set of sub-bands comprises: every sub-band in the plurality of sub-bands, or a subset of sub-bands in the plurality of sub-bands.

Aspect 11: The method of Aspect 8, wherein the averaging configuration indicates to average: layer 1 (L1) sub-band CLI measurements, or layer 3 (L3) sub-band CLI measurements.

Aspect 12: The method of Aspect 11, wherein the averaging configuration indicates to use, for generating the L3 sub-band CLI measurements, one of: common filter coefficients for two or more sub-band CLI measurements, or two or more different filter coefficients for the two or more sub-band CLI measurements.

Aspect 13: The method of any of Aspects 1-12, wherein the CLI configuration information indicates to omit a CLI metric for a sub-band, in the plurality of sub-bands, from the CLI report.

Aspect 14: The method of any of Aspects 1-13, further comprising: receiving an indication of a percentage of available resource elements (REs) for a sub-band in the plurality of sub-bands.

Aspect 15: The method of Aspect 14, further comprising: including, in the CLI report, a CLI metric for the sub-band in the CLI report when the percentage of available REs satisfies a threshold.

Aspect 16: The method of Aspect 15, further comprising: including an averaged CLI measurement in the CLI report, wherein the averaged CLI measurement is based at least in part on a CLI measurement for the sub-band when the percentage of available REs satisfies the threshold.

Aspect 17: The method of any of Aspects 1-16, wherein the CLI report includes a respective sub-band CLI metric for each sub-band of the plurality of sub-bands.

Aspect 18: The method of any of Aspects 1-17, wherein transmitting the CLI report comprises: transmitting the CLI report periodically, or transmitting the CLI report aperiodically.

Aspect 19: The method of any of Aspects 1-18, wherein transmitting the CLI report comprises: transmitting information indicating a number of sub-band CLI metrics included in the CLI report.

Aspect 20: The method of any of Aspects 1-19, wherein the CLI configuration information indicates a reporting condition, and wherein the at least one CLI metric is included in the CLI report based at least in part on the at least one CLI metric satisfying the reporting condition.

Aspect 21: The method of Aspect 20, wherein the CLI report includes each sub-band CLI metric that satisfies the reporting condition and the CLI report omits each CLI metric that fails to satisfy the reporting condition.

Aspect 22: The method of Aspect 20, wherein the reporting condition indicates to report one of: each sub-band CLI metric that satisfies a threshold, each sub-band CLI metric that fails to satisfy the threshold, or a maximum CLI metric out of a set of CLI metrics generated for the plurality of sub-bands.

Aspect 23: The method of Aspect 20, wherein the reporting condition indicates a CLI threshold, and wherein the CLI report indicates, for each CLI metric in a set of CLI metrics, whether the CLI metric satisfies the CLI threshold.

Aspect 24: The method of Aspect 23, wherein the CLI report indicates whether the CLI metric satisfies the CLI threshold using a bit indicator.

Aspect 25: The method of Aspect 20, wherein the reporting condition indicates to report a particular number of sub-band CLI metrics out of a set of sub-band CLI metrics associated with the plurality of sub-bands.

Aspect 26: The method of Aspect 25, wherein the reporting condition indicates to report, as the particular number of sub-band CLI metrics, one of: sub-band CLI metrics associated with the particular number of lowest CLI metric values in the set of sub-band CLI metrics, or sub-band metrics associated with the particular number of highest CLI metric values in the set of sub-band CLI metrics.

Aspect 27: The method of Aspect 20, wherein the reporting condition indicates to transmit the CLI report based at least in part on a trigger event.

Aspect 28: The method of Aspect 27, wherein the trigger event comprises one of: a difference between a current CLI metric for a sub-band and a prior CLI metric for the sub-band satisfying a difference threshold; or the current CLI metric satisfying a performance threshold.

Aspect 29: The method of any of Aspects 1-28, wherein the CLI configuration information indicates, in the plurality of sub-bands, to measure two or more continuous sub-bands or two or more discontinuous sub-bands.

Aspect 30: A method of wireless communication performed by a base station, comprising: transmitting, to a user equipment (UE), cross-link interference (CLI) configuration information that indicates a plurality of sub-bands for a CLI measurement resource; and receiving, from the UE, a CLI report indicating at least one CLI metric associated with at least one sub-band of the plurality of sub-bands.

Aspect 31: The method of Aspect 30, wherein the CLI configuration information comprises at least: a first sub-band CLI measurement resource configuration for sounding reference signal (SRS) reception in a first sub-band of the plurality of sub-bands, and a second sub-band CLI measurement resource configuration for SRS reception in a second sub-band of the plurality of sub-bands.

Aspect 32: The method of any of Aspects 30-31, wherein the CLI configuration information indicates, for each sub-band of the plurality of sub-bands, a start physical resource block (PRB) and a number of physical resource blocks (PRBs).

Aspect 33: The method of any of Aspects 30-32, wherein the CLI configuration information indicates, for each sub-band of the plurality of sub-bands, a start physical resource block (PRB) and an end PRB.

Aspect 34: The method of any of Aspects 30-33, wherein the CLI configuration information comprises a bit map associated with a set of pre-configured sub-bands, and wherein the CLI configuration information indicates to report the at least one CLI metric associated with the at least one sub-band based at least in part on the bit map.

Aspect 35: The method of Aspect 34, further comprising: transmitting, to the UE, an indication of the set of pre-configured sub-bands.

Aspect 36: The method of any of Aspects 30-35, wherein transmitting the CLI configuration information comprises: transmitting the CLI configuration information in at least one of: a sounding reference signal (SRS) resource configuration CLI information element (IE); a received signal strength indicator (RSSI) resource configuration CLI IE; or a layer 1 (L1) CLI report configuration IE.

Aspect 37: The method of any of Aspects 30-36, wherein the CLI configuration information indicates an averaging configuration for generating at least part of the CLI report.

Aspect 38: The method of Aspect 37, wherein the CLI configuration information indicates a set of sub-bands of the plurality of sub-bands, and wherein the averaging configuration indicates to average sub-band CLI measurements across all sub-bands in the set of sub-bands.

Aspect 39: The method of Aspect 38, wherein the set of sub-bands comprises: every sub-band in the plurality of sub-bands, or a subset of sub-bands in the plurality of sub-bands.

Aspect 40: The method of Aspect 37, wherein the averaging configuration indicates to average: layer 1 (L1) sub-band CLI measurements, or layer 3 (L3) sub-band CLI measurements.

Aspect 41: The method of Aspect 40, wherein the averaging configuration indicates to use, for generating the L3 sub-band CLI measurements, one of: common filter coefficients for two or more sub-band CLI measurements, or two or more different filter coefficients for the two or more sub-band CLI measurements.

Aspect 42: The method of any of Aspects 30-41, wherein the CLI configuration information indicates to omit a CLI metric for a sub-band, in the plurality of sub-bands, from the CLI report.

Aspect 43: The method of any of Aspects 30-42, further comprising: transmitting, to the UE, an indication of a percentage of available resource elements (REs) for a sub-band in the plurality of sub-bands.

Aspect 44: The method of Aspect 43, further comprising: indicating, in the CLI configuration information, to report a CLI metric for the sub-band in the CLI report when the percentage of available REs satisfies a threshold.

Aspect 45: The method of Aspect 44, further comprising: indicating, in the CLI configuration information, to include, in the CLI report, an averaged CLI measurement that is based at least in part on a CLI measurement for the sub-band when the percentage of available REs satisfies the threshold.

Aspect 46: The method of any of Aspects 30-45, wherein the CLI report includes a respective sub-band CLI metric for each sub-band of the plurality of sub-bands.

Aspect 47: The method of any of Aspects 30-46, wherein receiving the CLI report comprises: receiving the CLI report periodically, or receiving the CLI report aperiodically.

Aspect 48: The method of any of Aspects 30-47, wherein the CLI report comprises: information indicating a number of sub-band CLI metrics included in the CLI report.

Aspect 49: The method of of any of Aspects 30-48, wherein the CLI configuration information indicates a reporting condition, and wherein the CLI configuration information further indicates to include the at least one CLI metric in the CLI report based at least in part on the at least one CLI metric satisfying the reporting condition.

Aspect 50: The method of Aspect 49, wherein the CLI report includes each sub-band CLI metric that satisfies the reporting condition and the CLI report omits each CLI metric that fails to satisfy the reporting condition.

Aspect 51: The method of Aspect 49, wherein the reporting condition indicates to report one of: each sub-band CLI metric that satisfies a threshold, each sub-band CLI metric that fails to satisfy the threshold, or a maximum CLI metric out of a set of CLI metrics generated for the plurality of sub-bands.

Aspect 52: The method of Aspect 49, wherein the reporting condition indicates a CLI threshold, and wherein the CLI report indicates, for each CLI metric in a set of CLI metrics, whether the CLI metric satisfies the CLI threshold.

Aspect 53: The method of Aspect 52, wherein the CLI report indicates whether the CLI metric satisfies the CLI threshold using a bit indicator.

Aspect 54: The method of Aspect 49, wherein the reporting condition indicates to report a particular number of sub-band CLI metrics out of a set of sub-band CLI metrics associated with the plurality of sub-bands.

Aspect 55: The method of Aspect 54, wherein the reporting condition indicates to report, as the particular number of sub-band CLI metrics, one of: sub-band CLI metrics associated with the particular number of lowest CLI metric values in the set of sub-band CLI metrics, or sub-band metrics associated with the particular number of highest CLI metric values in the set of sub-band CLI metrics.

Aspect 56: The method of Aspect 49, wherein the reporting condition indicates to transmit the CLI report based at least in part on a trigger event.

Aspect 57: The method of Aspect 56, wherein the trigger event comprises one of: a difference between a current CLI metric for a sub-band and a prior CLI metric for the sub-band satisfying a difference threshold; or the current CLI metric satisfying a performance threshold.

Aspect 58: The method of any of Aspects 30-57, wherein the CLI configuration information indicates, in the plurality of sub-bands, to measure two continuous sub-bands or two discontinuous sub-bands.

Aspect 59: The method of any of Aspects 30-58, wherein the UE is a first UE and the method comprises: selecting, based at least in part on the CLI report, a minimum required guard band between downlink transmissions to the first UE and uplink transmissions from a second UE.

Aspect 60: An apparatus for wireless communication at a device, comprising a processor; memory coupled with the processor; and instructions stored in the memory and executable by the processor to cause the apparatus to perform the method of one or more of Aspects 1-29.

Aspect 61: A device for wireless communication, comprising a memory and one or more processors coupled to the memory, the one or more processors configured to perform the method of one or more of Aspects 1-29.

Aspect 62: An apparatus for wireless communication, comprising at least one means for performing the method of one or more of Aspects 1-29.

Aspect 63: A non-transitory computer-readable medium storing code for wireless communication, the code comprising instructions executable by a processor to perform the method of one or more of Aspects 1-29.

Aspect 64: A non-transitory computer-readable medium storing a set of instructions for wireless communication, the set of instructions comprising one or more instructions that, when executed by one or more processors of a device, cause the device to perform the method of one or more of Aspects 1-29.

Aspect 60: An apparatus for wireless communication at a device, comprising a processor; memory coupled with the processor; and instructions stored in the memory and executable by the processor to cause the apparatus to perform the method of one or more of Aspects 30-59.

Aspect 61: A device for wireless communication, comprising a memory and one or more processors coupled to the memory, the one or more processors configured to perform the method of one or more of Aspects 30-59.

Aspect 62: An apparatus for wireless communication, comprising at least one means for performing the method of one or more of Aspects 30-59.

Aspect 63: A non-transitory computer-readable medium storing code for wireless communication, the code comprising instructions executable by a processor to perform the method of one or more of Aspects 30-59.

Aspect 64: A non-transitory computer-readable medium storing a set of instructions for wireless communication, the set of instructions comprising one or more instructions that, when executed by one or more processors of a device, cause the device to perform the method of one or more of Aspects 30-59.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive cross-link interference (CLI) configuration information that indicates:
         for each sub-band of a plurality of sub-bands for a CLI measurement resource, a start physical resource block (PRB) and an end PRB, and
         an averaging configuration for generating at least part of a CLI report; and
      transmit the CLI report, wherein the CLI report indicates at least one CLI metric associated with at least one sub-band of the plurality of sub-bands.

2. The apparatus of claim 1, wherein the CLI configuration information comprises at least:

a first sub-band CLI measurement resource configuration for sounding reference signal (SRS) reception in a first sub-band of the plurality of sub-bands, and a second sub-band CLI measurement resource configuration for SRS reception in a second sub-band of the plurality of sub-bands.

3. The apparatus of claim 1, wherein the CLI configuration information indicates, for each sub-band of the plurality of sub-bands, a number of PRBs.

4. The apparatus of claim 1, wherein the CLI configuration information comprises a bit map associated with a set of pre-configured sub-bands, and wherein the CLI configuration information indicates to report the at least one CLI metric associated with the at least one sub-band based at least in part on the bit map.

5. The apparatus of claim 1, wherein the one or more processors, to receive the CLI configuration information, are configured to:
receive the CLI configuration information in at least one of:
a sounding reference signal (SRS) resource configuration information element (IE);
a received signal strength indicator (RSSI) resource configuration IE; or
a layer 1 (L1) CLI report configuration IE.

6. The apparatus of claim 1, wherein the averaging configuration indicates to average sub-band CLI measurements across all sub-bands in a set of sub-bands of the plurality of sub-bands.

7. The apparatus of claim 1, wherein the CLI configuration information indicates to omit a CLI metric for a sub-band, in the plurality of sub-bands, from the CLI report.

8. The apparatus of claim 1, wherein the CLI report includes a respective sub-band CLI metric for each sub-band of the plurality of sub-bands.

9. The apparatus of claim 1, wherein the one or more processors, to transmit the CLI report, are configured to:
transmit the CLI report periodically, or
transmit the CLI report aperiodically.

10. The apparatus of claim 1, wherein the one or more processors, to transmit the CLI report, are configured to:
transmit information indicating a number of sub-band CLI metrics included in the CLI report.

11. The apparatus of claim 1, wherein the CLI configuration information indicates a reporting condition, and wherein the at least one CLI metric is included in the CLI report based at least in part on the at least one CLI metric satisfying the reporting condition.

12. The apparatus of claim 11, wherein the CLI report includes each sub-band CLI metric that satisfies the reporting condition and the CLI report omits each CLI metric that fails to satisfy the reporting condition.

13. The apparatus of claim 12, wherein the reporting condition indicates a CLI threshold, and
wherein the CLI report indicates, for each CLI metric in a set of CLI metrics, whether the CLI metric satisfies the CLI threshold.

14. The apparatus of claim 13, wherein the CLI report indicates whether the CLI metric satisfies the CLI threshold using a bit indicator.

15. The apparatus of claim 11, wherein the reporting condition indicates to transmit the CLI report based at least in part on a trigger event.

16. The apparatus of claim 15, wherein the trigger event comprises one of:

a difference between a current CLI metric for a sub-band and a prior CLI metric for the sub-band satisfying a difference threshold; or
the current CLI metric satisfying a performance threshold.

17. An apparatus for wireless communication at a network node, comprising:
one or more memories; and
one or more processors, coupled to the one or more memories, configured to:
transmit, to a user equipment (UE), cross-link interference (CLI) configuration information that indicates:
for each sub-band of a plurality of sub-bands for a CLI measurement resource, a start physical resource block (PRB) and an end PRB, and
an averaging configuration for generating at least part of a CLI report; and
receive, from the UE, the CLI report, wherein the CLI report indicates at least one CLI metric associated with at least one sub-band of the plurality of sub-bands.

18. The apparatus of claim 17, wherein the CLI configuration information indicates, for each sub-band of the plurality of sub-bands, a number of PRBs.

19. The apparatus of claim 17, wherein the CLI configuration information comprises a bit map associated with a set of pre-configured sub-bands, and wherein the CLI configuration information indicates to report the at least one CLI metric associated with the at least one sub-band based at least in part on the bit map.

20. The apparatus of claim 17, wherein the one or more processors, to transmit the CLI configuration information, are configured to:
transmit the CLI configuration information in at least one of:
a sounding reference signal (SRS) resource configuration information element (IE);
a received signal strength indicator (RSSI) resource configuration IE; or
a layer 1 (L1) CLI report configuration IE.

21. The apparatus of claim 17, wherein the CLI configuration information indicates to omit a CLI metric for a sub-band, in the plurality of sub-bands, from the CLI report.

22. The apparatus of claim 17, wherein the CLI report includes a respective sub-band CLI metric for each sub-band of the plurality of sub-bands.

23. The apparatus of claim 17, wherein the CLI report comprises:
information indicating a number of sub-band CLI metrics included in the CLI report.

24. The apparatus of claim 17, wherein the CLI configuration information indicates a reporting condition, and
wherein the CLI configuration information further indicates to include the at least one CLI metric in the CLI report based at least in part on the at least one CLI metric satisfying the reporting condition.

25. The apparatus of claim 24, wherein the reporting condition indicates a CLI threshold, and
wherein the CLI report indicates, for each CLI metric in a set of CLI metrics, whether the CLI metric satisfies the CLI threshold.

26. A method of wireless communication performed by a user equipment (UE), comprising:
receiving cross-link interference (CLI) configuration information that indicates:
for each sub-band of a plurality of sub-bands for a CLI measurement resource, a start physical resource block (PRB) and an end PRB, and an averaging configuration for generating at least part of a CLI report; and transmitting the CLI report, wherein the CLI report indicates at least one CLI metric associated with at least one sub-band of the plurality of sub-bands.

27. The method of claim 26, wherein the CLI configuration information indicates to omit a CLI metric for a sub-band, in the plurality of sub-bands, from the CLI report.

28. The method of claim 26, wherein the CLI configuration information comprises at least:
   a first sub-band CLI measurement resource configuration for sounding reference signal (SRS) reception in a first sub-band of the plurality of sub-bands, and
   a second sub-band CLI measurement resource configuration for SRS reception in a second sub-band of the plurality of sub-bands.

29. A method of wireless communication performed by a base station, comprising:
   transmitting, to a user equipment (UE), cross-link interference (CLI) configuration information that indicates:
      for each sub-band of a plurality of sub-bands for a CLI measurement resource, a start physical resource block (PRB) and an end PRB, and
      an averaging configuration for generating at least part of a CLI report; and
   receiving, from the UE, the CLI report, wherein the CLI report indicates at least one CLI metric associated with at least one sub-band of the plurality of sub-bands.

30. The method of claim 29, wherein transmitting the CLI configuration information comprises:
   transmitting the CLI configuration information in at least one of:
      a sounding reference signal (SRS) resource configuration information element (IE);
      a received signal strength indicator (RSSI) resource configuration IE; or
      a layer 1 (L1) CLI report configuration IE.

* * * * *